(12) United States Patent
Nguyen-Thuyet

(10) Patent No.: US 10,539,015 B2
(45) Date of Patent: Jan. 21, 2020

(54) FLUID IDENTIFICATION VIA PRESSURE

(71) Applicant: SCHLUMBERGER TECHNOLOGY CORPORATION, Sugar Land, TX (US)

(72) Inventor: Alain Nguyen-Thuyet, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 647 days.

(21) Appl. No.: 15/259,426

(22) Filed: Sep. 8, 2016

(65) Prior Publication Data

US 2017/0074095 A1 Mar. 16, 2017

(30) Foreign Application Priority Data

Sep. 16, 2015 (EP) ...................... 15290232

(51) Int. Cl.
| | |
|---|---|
| E21B 34/06 | (2006.01) |
| E21B 47/06 | (2012.01) |
| E21B 49/08 | (2006.01) |
| E21B 49/10 | (2006.01) |
| G05B 19/042 | (2006.01) |
| E21B 47/12 | (2012.01) |

(52) U.S. Cl.
CPC ............ *E21B 49/081* (2013.01); *E21B 34/06* (2013.01); *E21B 47/06* (2013.01); *E21B 49/088* (2013.01); *E21B 49/10* (2013.01); *G05B 19/042* (2013.01); *E21B 47/12* (2013.01); *E21B 2049/085* (2013.01); *G05B 2219/37399* (2013.01); *G05B 2219/45129* (2013.01)

(58) Field of Classification Search
CPC .... E21B 2049/085; E21B 34/06; E21B 47/06; E21B 47/12; E21B 49/081; E21B 49/088; E21B 49/10; G05B 19/042; G05B 2219/37399; G05B 2219/45129
See application file for complete search history.

(56) References Cited

U.S. PATENT DOCUMENTS

| | | | |
|---|---|---|---|
| 6,758,090 B2 | 7/2004 | Bostrom et al. | |
| 7,234,521 B2 | 6/2007 | Shammai et al. | |
| 7,461,547 B2 | 12/2008 | Terabayashi et al. | |
| 2006/0155472 A1* | 7/2006 | Venkataramanan | .... E21B 49/00 702/10 |
| 2006/0155474 A1* | 7/2006 | Venkataramanan | .... E21B 49/00 702/13 |
| 2008/0245569 A1* | 10/2008 | Nold | ........................ E21B 49/10 175/24 |
| 2009/0150079 A1* | 6/2009 | Hsu | .......................... E21B 49/10 702/11 |
| 2009/0166085 A1* | 7/2009 | Ciglenec | ................. E21B 49/08 175/24 |

(Continued)

*Primary Examiner* — Daniel P Stephenson
(74) *Attorney, Agent, or Firm* — Sara K.M. Hinkley

(57) ABSTRACT

Apparatus and methods for assessing contamination of formation fluid. A downhole sampling tool is operated to draw fluid from a subterranean formation into a chamber of the downhole sampling tool. The downhole sampling tool is then operated to discharge the fluid from the chamber while monitoring pressure of the fluid and volume of the chamber. Contamination of the discharged fluid is assessed based on the monitored fluid pressure and the monitored chamber volume.

18 Claims, 10 Drawing Sheets

(56) References Cited

U.S. PATENT DOCUMENTS

| | | | | |
|---|---|---|---|---|
| 2010/0155061 A1* | 6/2010 | Zazovsky | ............ | E21B 49/008 166/264 |
| 2011/0218736 A1* | 9/2011 | Pelletier | ................ | E21B 49/081 702/12 |
| 2011/0276187 A1* | 11/2011 | Ciglenec | ................. | E21B 49/10 700/282 |
| 2014/0151038 A1* | 6/2014 | Galvan-Sanchez | ......................... | E21B 49/082 166/264 |
| 2014/0180591 A1* | 6/2014 | Hsu | ........................ | G01V 11/00 702/8 |
| 2014/0224474 A1* | 8/2014 | Cernosek | ................ | E21B 49/08 166/107 |
| 2017/0022809 A1* | 1/2017 | Garcia | .................. | E21B 49/088 |
| 2017/0074095 A1* | 3/2017 | Nguyen-Thuyet | .... | E21B 49/081 |

* cited by examiner

FLUID IDENTIFICATION VIA PRESSURE

CROSS-REFERENCE TO RELATED APPLICATIONS

This application claims the benefit of European Patent Application No. 15290232.6, titled "Fluid Identification Via Pressure", filed on Sep. 16, 2015, the entire content of which is incorporated by reference into the current application.

DISCLOSURE

Wells are generally drilled into the ground or ocean bed to recover natural deposits of oil and gas, as well as other desirable materials that are trapped in geological formations in the Earth's crust. Such wells are drilled using a drill bit attached to the lower end of a drill string. Drilling fluid is pumped from the wellsite surface down through the drill string to the drill bit. The drilling fluid lubricates and cools the bit, and may additionally carry drill cuttings from the wellbore back to the surface.

In various oil and gas exploration operations, it may be beneficial to have information about the subsurface formations that are penetrated by the wellbore. For example, certain formation evaluation schemes include measurement and analysis of the formation pressure and permeability. Other measurements may include extracting fluid from the formation, and analyzing and/or testing the extracted fluid samples. These measurements may be useful for predicting the production capacity and production lifetime of the subsurface formation.

However, in the process of drilling, the drilling fluid may seep and/or permeate through the wellbore walls, thereby contaminating formation fluid near the wellbore wall. Thus, to obtain a representative and/or accurate sample of formation fluid, fluid may be pumped from the formation and dumped into the wellbore until a sufficiently low level of contamination exists in the pumped fluid, at which time a representative and/or accurate sample may be captured within the downhole sampling tool.

During such operations, it is difficult to identify whether the fluid being pumped from the formation substantially comprises native formation fluid or infiltrated drilling fluid. Resistivity sensors, optical fluid analyzers, and other devices may be utilized to assess the fluid types and/or contamination within the pumped fluid. However, such devices are sensitive to high-temperature, high-pressure, and other harsh downhole environments, and consume precious real estate within the limited internal volume of the downhole sampling tool.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes operating a downhole sampling tool to draw fluid from a subterranean formation into a chamber of the downhole sampling tool. The downhole sampling tool is then operated to discharge the fluid from the chamber while monitoring pressure of the fluid and volume of the chamber. Contamination of the discharged fluid is assessed based on the monitored fluid pressure and the monitored chamber volume.

The present disclosure also introduces an apparatus that includes a downhole sampling tool for conveyance within a wellbore extending into a subterranean formation. The downhole sampling tool includes a chamber having a chamber volume. The downhole sampling tool is operable to adjust the chamber volume, draw fluid from the subterranean formation into the chamber, and discharge the fluid from the chamber into the wellbore. The downhole sampling tool also includes a first sensor operable to generate first information related to pressure of the fluid within the chamber, and a second sensor operable to generate second information indicative of the chamber volume. The downhole sampling tool also includes a processing device operable to receive the first and second information generated by the first and second sensors, respectively, and assess contamination of the fluid discharged from the chamber based on the received first and second information.

The present disclosure also introduces a method that includes conveying a downhole sampling tool within a wellbore extending into a subterranean formation. The downhole sampling tool includes a pump having a cylinder, a piston slidably disposed in the cylinder, and a chamber at least partially defined by at least one external surface of the piston and at least one internal surface of the cylinder such that a volume of the chamber is variable in response to movement of the piston within the cylinder. The pump is operated to draw fluid from a subterranean formation into the chamber, and then discharge the fluid from the chamber while monitoring pressure of the fluid and volume of the chamber. Contamination of the discharged fluid is assessed based on the monitored fluid pressure and the monitored chamber volume.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
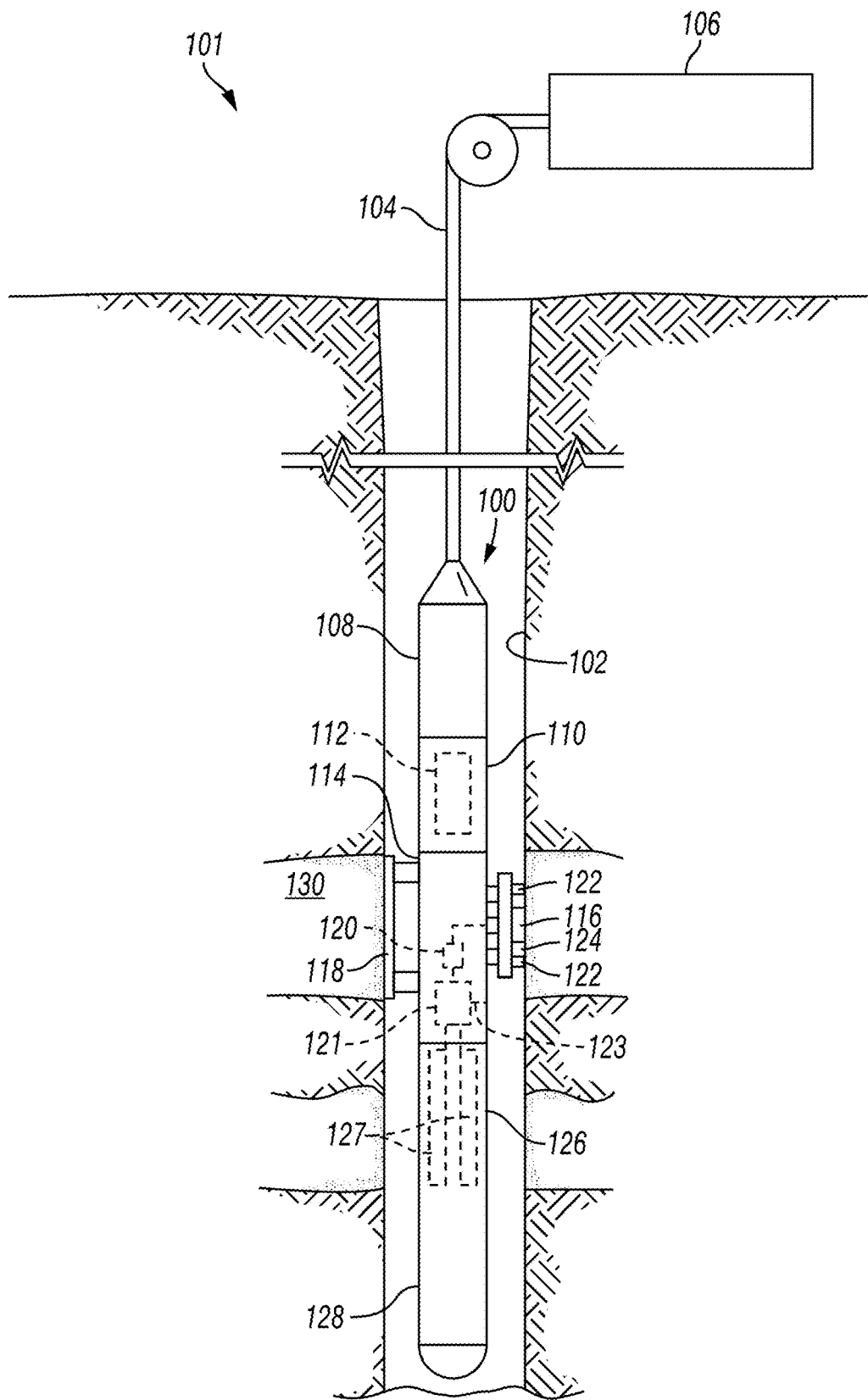
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a wellsite system 101 to which one or more aspects of the present disclosure may be applicable. The wellsite system 101, which may be situated onshore or offshore, comprises a downhole tool 100 operable for engaging a portion of a sidewall of a wellbore 102 penetrating a subterranean formation 130. The downhole tool 100 may be suspended in the wellbore 102 from a lower end of a multi-conductor cable 104 that may be spooled on a winch (not shown) at the Earth's surface. At the surface, the cable 104 may be communicatively coupled to surface equipment 106. For example, the surface equipment 106 may include a controller and/or other processing system for controlling the downhole tool 100. Thus, the surface equipment 106 may also be referred to herein as the electronics and processing system 106. The surface equipment 106 may also have an interface for receiving commands from a surface operator. The surface equipment 106 may also store programs or instructions, including for implementing one or more aspects of the methods described herein.

The downhole tool 100 may comprise a telemetry module 110, a formation test module 114, and a sample module 126. Although the telemetry module 110 is shown as being implemented separate from the formation test module 114, the telemetry module 110 may be implemented in the formation test module 114. The downhole tool 100 may also comprise additional components at various locations, such as a module 108 above the telemetry module 110 and/or a module 128 below the sample module 126, each of which may have varying functionality within the scope of the present disclosure.

The formation test module 114 may comprise a selectively extendable probe assembly 116 and a selectively extendable anchoring member 118 that are respectively arranged on opposing sides. The probe assembly 116 may be operable to selectively seal off or isolate selected portions of the sidewall of the wellbore 102. For example, the probe assembly 116 may comprise a sealing pad 124 that may be urged against the sidewall of the wellbore 102 in a sealing manner to prevent movement of fluid into or out of the formation 130 other than through the probe assembly 116. The probe assembly 116 may thus be operable to fluidly couple a pump 121 and/or other components of the formation test module 114 to the adjacent formation 130. Accordingly, the formation test module 114 may be utilized to obtain fluid samples from the formation 130 by extracting fluid from the formation 130 using the pump 121. The fluid samples may thereafter be expelled through a port 123 into the wellbore 102 during a "clean up" operation until the fluid extracted from the formation 130 reaches a sufficiently low contamination level, at which time the extracted fluid may be directed to one or more detachable sample chambers 127 disposed in the sample module 126. The detachable sample chambers 127 may receive and retain the captured formation fluid for subsequent testing at the surface. The detachable sample chambers 127 may be certified for highway and/or other transportation.

While the downhole tool 100 is depicted as comprising one pump 121, it may also comprise multiple pumps. The pump 121 and/or other pumps of the downhole tool 100 may also comprise a reversible pump operable to pump in two directions (e.g., into and out of the formation 130, into and out of the sample chamber(s) 127, etc.). Example implementations of the pump 121 are described below.

The probe assembly 116 may comprise one or more sensors 122 adjacent a port of the probe assembly 116, among other possible locations. The sensors 122 may be utilized in the determination of petrophysical parameters of a portion of the formation 130 proximate the probe assembly 116. For example, the sensors 122 may be utilized to measure or detect one or more of pressure, temperature, composition, electric resistivity, dielectric constant, magnetic resonance relaxation time, nuclear radiation, and/or combinations thereof, although other types of sensors are also within the scope of the present disclosure.

The formation test module 114 may also comprise a fluid sensing unit 120 through which obtained fluid samples may flow, such as to measure properties and/or composition data of the sampled fluid. For example, the fluid sensing unit 120 may comprise one or more of a spectrometer, a fluorescence sensor, an optical fluid analyzer, a density and/or viscosity sensor, and/or a pressure and/or temperature sensor, among others.

The telemetry module 110 and/or another portion of the downhole tool 100 may comprise a downhole control system 112 communicatively coupled to the surface equipment 106. The downhole control system 112 may include a controller and/or other processing system for controlling operational aspects of the downhole tool 100, and may have an interface for receiving commands from the surface operator. The downhole control system 112 may also store programs or instructions, including for implementing one or more aspects of the methods described herein. For example, the surface equipment 106 and/or the downhole control system 112 may operate independently or cooperatively to control the probe assembly 116 and/or the extraction of fluid samples from the formation 130, such as via control of the pump 121. The surface equipment 106 and/or the downhole control system 112 may also analyze and/or process data obtained from sensors disposed in the fluid sensing unit 120 and/or the sensors 122, store measurements and/or processed data, and/or communicate the measurements and/or processed data to the surface and/or another component for subsequent analysis.

One or more of the modules of the downhole tool 100 depicted in FIG. 1 may be substantially similar to and/or otherwise have one or more aspects in common with corresponding modules and/or components shown in other figures and/or described below. For example, one or more aspects of the formation test module 114 and/or the sample module 126 may be substantially similar to one or more aspects of a formation test module 234 and/or a sample module 236, respectively, which are described below in reference to FIG. 2.

Figure 2:
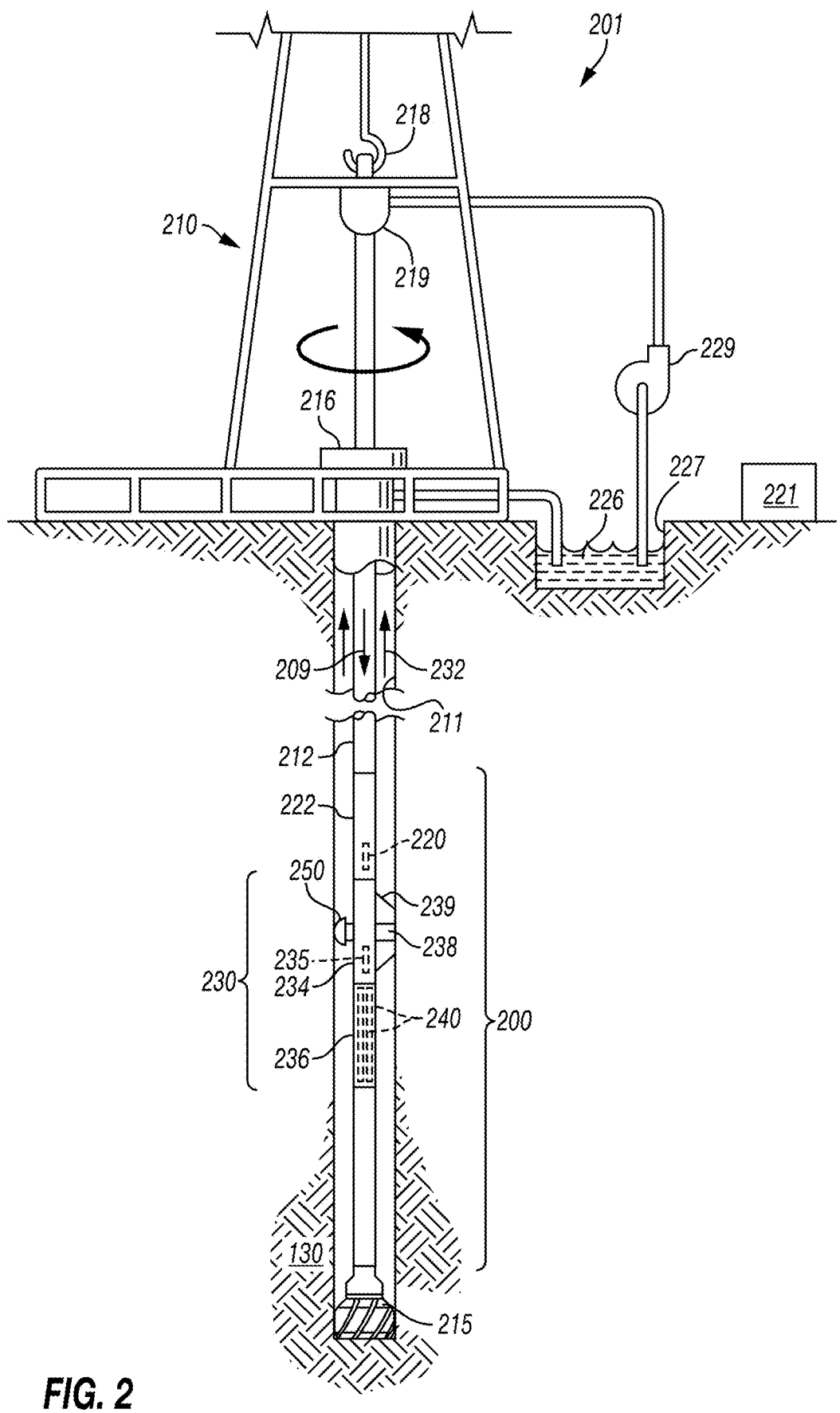
FIG. 2 is a schematic view of at least a portion of an example implementation of apparatus according to one or more aspects of the present disclosure.

FIG. 2 is a schematic view of at least a portion of another example implementation of a wellsite system 201 to which one or more aspects of the present disclosure may be applicable. The wellsite system 201 comprises a downhole tool 200 suspended from a rig 210 and into a wellbore 211 via a drill string 212. The downhole tool 200, or a bottom hole assembly (BHA) comprising the downhole tool 200, comprises or is coupled to a drill bit 215 at its lower end that is utilized to advance the downhole tool 200 into the formation 130 and form the wellbore 211. The drillstring 212 may be rotated by a rotary table 216 that engages a kelly on the rig floor near the upper end of the drillstring 212. The drillstring 212 is suspended via a hook 218 and swivel 219 and extends through the kelly in a manner permitting rotation of the drillstring 212 relative to the hook 218. However, a top drive may be utilized instead of or in addition to kelly/rotary table 216 arrangements.

The rig 210 is depicted as a land-based platform and derrick assembly utilized to form the wellbore 211 by rotary drilling in a manner that is well known. A person having ordinary skill in the art will appreciate, however, that one or more aspects of the present disclosure may also find application in other applications, including non-land-based drilling.

Drilling fluid 226 is stored in a pit 227 formed at the wellsite. A pump 229 delivers drilling fluid 226 to the interior of the drillstring 212 via a port in the swivel 219, inducing the drilling fluid 226 to flow downward through the drillstring 212, as indicated by directional arrow 209. The drilling fluid 226 exits the drillstring 212 via ports in the drill bit 215, and then circulates upward through the annulus defined between the outside of the drillstring 212 and the wall of the wellbore 211, as indicated by direction arrows 232. In this manner, the drilling fluid 226 lubricates the drill bit 215 and carries formation cuttings up to the surface as it is returned to the pit 227 for recirculation.

At the surface, the wellsite system 201 may comprise surface equipment 221. For example, the surface equipment 221 may include a controller and/or other processing system for controlling the downhole tool 200. Thus, the surface equipment 221 may also be referred to herein as the electronics and processing system 221. The surface equipment 221 may include an interface for receiving commands from the surface operator. The surface equipment 221 may also store programs or instructions, including for implementing one or more aspects of the methods described herein.

The downhole tool 200, which may be part of the BHA, may be positioned near the drill bit 215 (e.g., within several drill collar lengths from the drill bit 215). The downhole tool 200 may also comprise a sampling while drilling (SWD) system 230 comprising the formation test module 234 and the sample module 236, which may be individually or collectively housed in one or more drill collars for performing various formation evaluation and/or sampling functions. The formation test module 234 may be positioned adjacent the sample module 236, and may comprise one or more pumps 235, gauges, sensors, monitors, and/or other devices that may also be utilized for downhole sampling and/or testing. The downhole tool 200 is depicted in FIG. 2 as having a modular construction, with specific components disposed in certain modules. However, the downhole tool 200 may instead be unitary, or select portions of the downhole tool 200 may be modular. The modules and/or the components of the downhole tool 200 may be positioned in a variety of configurations and locations throughout the downhole tool 200.

The formation test module 234 may comprise a fluid communication device 238 that may be positioned in a stabilizer blade or rib 239. The fluid communication device 238 may be or comprise one or more probes, inlets, and/or other means for receiving fluid pumped from the formation 130 and/or the wellbore 211. The fluid communication device 238 may also comprise a flowline (not shown) extending within the downhole tool 200 for passing fluids to other locations and/or components of the downhole tool 200. The fluid communication device 238 may be movable between extended and retracted positions for selectively engaging a wall of the wellbore 211 and acquiring one or more fluid samples from the formation 130. The formation test module 234 may also comprise a back-up piston 250 operable to assist in positioning the fluid communication device 238 against the wall of the wellbore 211. The sample module 236 may comprise one or more sample chambers 240, such as may be detachable from the sample module 236 at surface, and which may be certified for subsequent highway and/or other transportation. One or more aspects of the formation test module 234, the sample module 236, and/or the fluid communication device 238 may be structurally, functionally, and/or otherwise substantially similar to the formation test module 114, the sample module 126, and/or the probe assembly 116, respectively, described above.

The downhole tool 200 may also comprise a telemetry module 222 for communicating with the surface equipment 221. The telemetry module 222 and/or another portion of the downhole tool 200 may comprise a downhole control system 220 in communication with the surface equipment 221. The downhole control system 220 may include a controller and/or other processing system operable to control the downhole tool 200. The downhole control system 220 may also store programs or instructions, including for implementing one or more aspects of the methods described herein. For example, the surface equipment 221 and/or the downhole control system 220 may operate or be operable to control the fluid communication device 238 and/or the extraction of fluid from the formation 130, such as by controlling the pump 235. The surface equipment 221 and/or the downhole control system 220 may also analyze and/or process data obtained from sensors disposed in downhole tool 200, store measurements and/or processed data, and/or communicate the measurements and/or processed data to other components for subsequent analysis.

Figure 3:
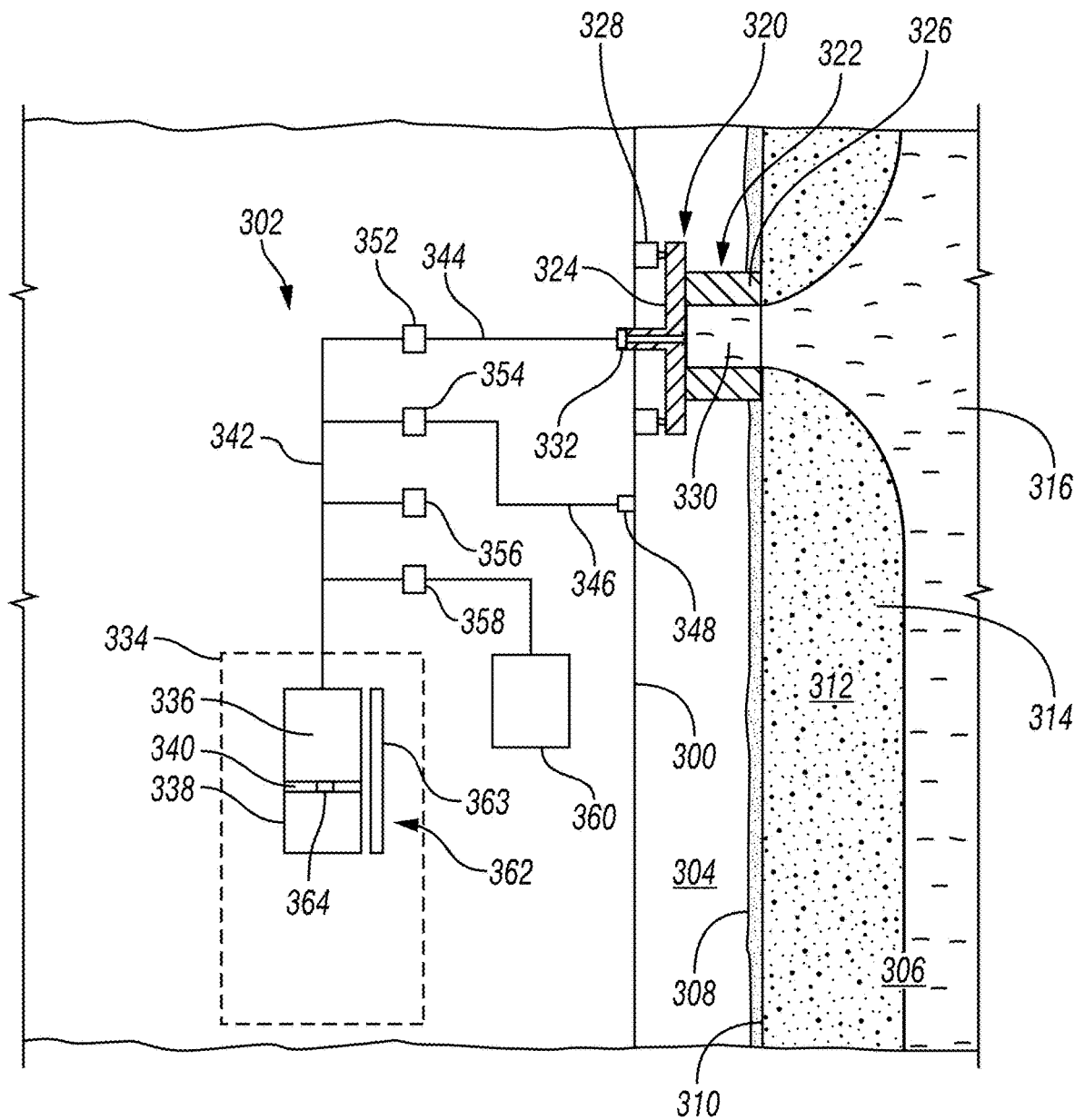
FIG. 3 is a schematic view of a portion of an example implementation of the apparatus shown in FIGS. 1 and 2 according to one or more aspects of the present disclosure.

FIG. 3 is a schematic view of a portion of an example implementation of either of the downhole tools 100, 200 shown in FIGS. 1 and 2 according to one or more aspects of the present disclosure, designated in FIG. 3 by reference numeral 300. The downhole tool 300 is depicted in FIG. 3 as being disposed within a wellbore 304 penetrating a subterranean formation 306. A layer of "mud cake" 308 has been formed lining a sidewall 310 of the wellbore 304. An invaded zone 312 exists in the near-wellbore region of the formation 306 as the result of drilling fluid invading the formation 306 during drilling operations. The contaminated fluid 314 within the invaded zone 312 comprises varying concentrations of drilling fluid and native formation fluid 316. Beyond the invaded zone 312, the formation 306 primarily contains native formation fluid 316.

As described above with respect to FIGS. 1 and 2, the downhole tool 300 comprises a probe assembly 320 for communicating fluid from the formation 306 into the downhole tool 300. The probe assembly 320 comprises an extendable base 324 carrying a probe 322 having a sealing member 326, such as an elastomeric packer, for sealingly contacting and thereby internally isolating a section of the sidewall 310 through which fluid will be drawn from the formation 316. The probe 322 defines a fluid channel 330 through which fluid from the formation 306 is communicated into a fluid inlet 332 of the downhole tool 300. The probe assembly 320 may be selectively extendable from the downhole tool 300 via extension pistons 328, such as may be hydraulically, mechanically, and/or otherwise actuated to extend the probe 322 into sealing contact with the sidewall 310. However, the probe assembly 320 may not be extendable, but may instead be urged into contact with the sidewall 310 via operation of one or more back-up pistons (not shown in FIG. 3, but perhaps similar to the back-up pistons 118, 250 shown in FIGS. 1 and 2). A combination of an extendable probe assembly and back-up piston arrangement may also be utilized.

As also described above with respect to FIGS. 1 and 2, the downhole tool 300 also comprises a pumping system 302 that operates to pump or otherwise move fluid into and out of the downhole tool 300. As described below, the pumping system 302 may be utilized in determining the presence of drilling fluid (i.e., contamination) in the fluid drawn from the formation 306 into the downhole tool 300.

The pumping system 302 comprises a pump assembly 334 operable to create a pressure differential to draw fluid from the formation 306 through the probe assembly 320 and into the downhole tool 300. The pump assembly 334 may be or comprise an electromechanical, hydraulic, and/or other type of pump.

In the schematic example depicted in FIG. 3, the pump assembly 334 is a displacement unit (DU) having a pressure chamber 336 that receives the fluid drawn from the formation 306. The pump assembly 334 is operable to increase and decrease the volume of the pressure chamber 336, resulting in a corresponding decrease and increase, respectively, of the pressure of the fluid in the pressure chamber 336.

For example, the pump assembly 334 may comprise a piston 340 slidably disposed within a cylinder 338, such that the pressure chamber 336 may be defined by portions of one or more internal surfaces of the cylinder 338 and one or more external surfaces of the piston 340. Thus, movement of the piston 340 within the cylinder 338 changes the volume of the pressure chamber 336 and pressurizes and depressurizes the fluid therein. The piston 340 may comprise fluid seals and/or other means (not shown) for fluidly sealing the pressure chamber 336 from the remaining portion of the cylinder 338 and/or other portions of the pump assembly 334, such as to maintain the fluid sealed within the pressure chamber 336 throughout operation of the pumping system 302, as further described below.

The piston 340 may be moved within the cylinder 338 by various actuation means. For example, the piston 340 may be mechanically connected to a shaft (not shown), which may transfer force from an actuator (not shown) located within the pump assembly 334 or another portion of the downhole tool 300. Such shaft may be operatively connected to a linear actuator, such as a hydraulic or pneumatic cylinder assembly. The shaft may also be actuated by a rotary actuator, such as an electric motor or fluid powered rotary actuator. The rotary actuator may be operatively connected to the shaft via a rack-and-pinion assembly, wherein the shaft may include or be connected with a linear gear bar, while the rotary actuator drives a corresponding pinion gear. The rotary actuator may also be connected to the shaft via a crosshead mechanism operatively connecting the rotary actuator with the shaft. A ball screw operatively coupled with the rotary actuator via a gearbox, and that extends through the cylinder 338 and the piston 340, may also be utilized to drive the piston 340.

Although FIG. 3 shows the pump assembly 334 being implemented as a single stroke pump comprising the single acting piston 340 disposed within the cylinder 338, thus defining the pressure chamber 336 on one side of the piston 340 and having a single inlet/outlet for receiving and discharging fluid, it is to be understood that the pump assembly 334 (as well as the pumps 121, 235 shown in FIGS. 1 and 2) may be or comprise a duplex pump assembly (not shown) having a double acting piston disposed within and dividing a cylinder to define two pressure chambers located on opposing sides of the piston. In such a duplex pump assembly, each pressure chamber may comprise a separate fluid inlet and outlet, such as may facilitate simultaneous flow of fluid into and out of the opposing pressure chambers as the piston reciprocates within the cylinder.

The surface equipment 106, 221, the downhole control systems 112, 220, and/or other portions of the wellsite systems 101, 201 may be further operable to monitor or otherwise track the volume of the pressure chamber 336 during operations of the pumping system 302. For example, because the diameter of the cylinder 338 is known, the volume of the pressure chamber 336 may be monitored via one or more position sensors 362 operable for detecting the position of the piston 340 with respect to the cylinder 338. Each position sensor 362 may be or comprise a linear position sensor disposed in association with the cylinder 338 and/or the piston 340, such as may be operable to generate electrical signals and/or other information related to or indicative of position of the piston 340 along the cylinder 338. The linear position sensor may comprise a transducer portion 363, which may be electrically powered and mounted in a stationary position relative to the pump assembly 334, and a passive portion 364, which may be mounted in association with a moving member and which may not be electrically powered.

For example, as shown in FIG. 3, the transducer portion 363 of the position sensor 362 may be disposed along the length of the cylinder 338, and the passive portion 364 of the position sensor 362, such as a coil or a magnet, may be carried with and/or otherwise disposed in association with the piston 340. If the piston 340 is attached to a shaft, the passive portion 364 may be connected to or disposed along a portion of the shaft and, thus, movable with the piston 340, and the transducer portion 363 may be connected to the cylinder 338 and/or another stationary portion of the pump assembly 334. In these and other implementations within the scope of the present disclosure, the position sensor 362 may be or comprise an inductive sensor, a linear variable-differential transformer (LVDT), a magnetostrictive transducer, or a linear potentiometer, among other examples.

If a rotary actuator drives the piston 340, the position sensor 362 may be or comprise a rotary position sensor disposed in association with the rotary actuator or another rotating portion of the pump assembly 334. For example, such a rotary position sensor may be operable to generate electrical signals and/or other information related to or indicative of angular position associated with operation of the pump assembly 334. The information related to the angular position may then be converted or otherwise utilized to determine the linear position of the piston 340 and, thus, the volume of the pressure chamber 336. The rotary position sensor may be or comprise an encoder, a rotary potentiometer, a synchro, a resolver, and/or a rotary variable differential transformer (RVDT), among other examples. Although the present disclosure describes different types of position sensors 362, it is to be understood that the position of the piston 340 may be tracked by other means known in the art, including ultrasonic, optical, laser, and other position sensors and/or distance measuring devices.

If the pump assembly 334 is or comprises a duplex pump assembly, the information generated by the position sensor 362 may also be utilized to determine or monitor the position of the double acting piston (not shown) within the cylinder. The position of the double acting piston and the surface area of each side of the double acting piston may then be utilized to determine or calculate the volume of each pressure chamber. If the information generated by the position sensor 362 may not be utilized to determine the volume of the second pressure chamber, a second position sensor (not shown) may be utilized in association with the second pressure chamber or another portion of the pump assembly 334 to determine or monitor the volume of the second pressure chamber.

The pumping system 302 may further comprise a plurality of flowlines and/or other fluid pathways for communicating fluid into and out of the pressure chamber 336. The fluid pathways may include a common fluid pathway 342 extending from a fluid inlet/outlet of the pressure chamber 336. An inlet fluid pathway 344 may extend between the fluid inlet 332 and the common fluid pathway 342 for directing fluid drawn from the formation 306 into the pressure chamber 336. An outlet fluid pathway 346 may extend between the common fluid pathway 342 and a fluid port or other outlet 348 for directing fluid from the pressure chamber 336 to the wellbore 304.

The pumping system 302 may further comprise one or more flow control devices for selectively blocking, restricting, or otherwise controlling the flow of fluid between the formation 306, the pressure chamber 336, the wellbore 304, and other locations within the downhole tool 300. The flow control devices may comprise ball valves, globe valves, butterfly valves, check valves, and/or other types of valves operable to shut off or otherwise control fluid flow. The flow control devices may be actuated by an electric actuator, such as a solenoid or motor, or by a fluid actuator, such as a pneumatic cylinder or rotary actuator.

In the example implementation shown in FIG. 3, a valve 352 is operable to control fluid flow between the fluid pathways 342, 344 extending between the fluid inlet 332 and the pressure chamber 336. The valve 352 may be or comprise a flow restricting valve and/or other means operable to restrict the flow of fluid into the pressure chamber 336, such as to create a pressure drop downstream of the valve 352 and, thus, reduce the pressure of fluid within the pressure chamber 336. The valve 352 may also be or comprise a check valve operable to prevent fluid flow from the pressure chamber 336 to the fluid inlet 332 but permit fluid flow from the fluid inlet 332 to the pressure chamber 336 when the pressure differential between the fluid inlet 332 and the pressure chamber 336 surpasses a set pressure (i.e., cracking pressure) of the check valve. The set pressure, which is the minimum differential pressure at which the check valve will open, may be predetermined, for example, by selecting or changing an internal spring and/or other operator. The set pressure of the check valve may range between about zero pounds per square inch (PSI) and about 500 PSI, although other set pressures are also within the scope of the present disclosure. For example, the set pressure of the check valve may range between about 50 PSI and about 100 PSI, such as may minimize pumping efficiency losses but still create the intended pressure drop downstream of the check valve.

Another valve 354 is operable to shut off or otherwise control fluid flow between fluid pathways 342, 346 extending between the pressure chamber 336 and the fluid outlet 348. The valve 354 may also be or comprise a check valve operable to prevent fluid flow from the fluid outlet 348 to the pressure chamber 336, but permit fluid flow from the pressure chamber 336 to the fluid outlet 348 when the fluid in the pressure chamber 336 reaches a set pressure of the check valve. The set pressure of the second check valve may range between about 0% and about 90% of the maximum operating pressure of the pump assembly 334, although other set pressures are also within the scope of the present disclosure.

The pumping system 302 may further comprise a pressure sensor 356 operable to generate electric signals and/or other information related to pressure of the fluid within the pressure chamber 336. For example, the pressure sensor 356 may be fluidly connected with the common fluid pathway 342 and, thus, the pressure chamber 336. Although the pressure sensor 356 is shown connected with the common fluid pathway 342, it is to be understood that the pressure sensor 356 may be fluidly connected directly with the pressure chamber 336 or another location permitting the pressure sensor 356 to monitor the pressure of the fluid within the pressure chamber 336.

The pumping system 302 also comprises a sample chamber 360, such as a detachable bottle or other means for capturing a fluid sample discharged from the pressure chamber 336. For example, a valve 358 may be operable to shut off or otherwise control fluid flow between the pressure chamber 336 and the sample chamber 360. Although the sample chamber 360 is shown comprising a single chamber located adjacent the pump assembly 334, the sample chamber 360 may comprise a plurality of chambers, which may be located in different portions or modules of the downhole tool 300, perhaps in a manner similar to the sample chambers 127, 240 of the downhole tools 100, 200, shown in FIGS. 1 and 2, respectively.

Although the pump assembly 334 is shown and/or described above as a single stroke pump or a duplex pump having a piston moved within a cylinder by a shaft that is operably connected with an actuator, the pump assembly 334 (as well as the pumps 121, 235 shown in FIGS. 1 and 2) may also be implemented as a hydrostatic pump assembly having a piston moved within a cylinder via hydrostatic wellbore pressure and/or another ambient pressure external to the downhole tool 300. FIGS. 4-7 are schematic views of a portion of an example of such an implementation of one or more of the downhole tools 100, 200, 300 shown in FIGS. 1-3 according to one or more aspects of the present disclosure, wherein the downhole tool 100, 200, 300 is designated in FIGS. 4-7 by reference numeral 400. FIGS. 4-7 depict the downhole tool 400 in different stages or modes of operation according to one or more aspects of the present disclosure. The following description refers to FIGS. 4-7, collectively.

The downhole tool 400 is depicted in FIGS. 4-7 as being disposed within the wellbore 304 adjacent the subterranean formation 306. The downhole tool 400 comprises a pump assembly 402. The pump assembly 402 comprises an upper cylindrical space or cylinder 410 located above and in axial alignment with a lower cylindrical space or cylinder 412. A piston assembly 420 comprises an upper piston 422 disposed within the upper cylinder 410 and a lower piston 424 disposed within the lower cylinder 412. The upper and lower pistons 422, 424 may be fixedly coupled together by a rod or other linking member 426 extending between the upper and lower pistons 422, 424.

The upper piston 422 divides the upper cylinder 410 to form a pressure chamber 442 and a first working chamber 444. An upper surface 432 of the upper piston 422 forms a moveable boundary that partially defines the pressure chamber 442, and a lower surface 434 of the upper piston 422 forms a moveable boundary that partially defines the first working chamber 444.

The lower piston 424 divides the lower cylinder 412 to form a second working chamber 446 and a third working chamber 448. An upper surface 436 of the lower piston 424 forms a moveable boundary that partially defines the second working chamber 446, and a lower surface 438 of the lower piston 424 forms a moveable boundary that partially defines the third working chamber 448.

The upper cylinder 410, the piston assembly 420, and the pressure chamber 442 are example implementations of the cylinder 338, the piston 340, and the pressure chamber 336, respectively, shown in FIG. 3. Similarly, an inlet fluid pathway 452 of the downhole tool 400 is an example implementation of the inlet fluid pathway 344 shown in FIG. 3, and thus receives the fluid drawn from the formation 306. Likewise, an outlet fluid pathway 454 of the downhole tool 400 is an example implementation of the outlet fluid pathway 346 shown in FIG. 3, and thus discharges fluid from the pressure chamber 442 into the wellbore 304 (and/or another portion of the downhole tool 400).

The pressure chamber 442 is in fluid communication with a selective one of the inlet fluid pathway 452 and the outlet fluid pathway 454. For example, a first valve 456 and/or other hydraulic circuitry may selectively fluidly couple the pressure chamber 442 to the inlet fluid pathway 452, while a second valve 458 and/or other hydraulic circuitry may selectively fluidly couple the pressure chamber 442 to the outlet fluid pathway 454. However, the valves 456, 458 may instead collectively comprise a single valve, more than two valves, and/or other hydraulic circuitry. The valves 456, 458 and/or the equivalent hydraulic circuitry may comprise check valves permitting fluid flow in a single direction, although piloted and/or other types of valves are also within the scope of the present disclosure. The valves 456, 458 are example implementations of the valves 352, 356, respectively, shown in FIG. 3.

The pump assembly 402 also comprises a high-pressure chamber 462 and a low-pressure chamber 464. The low-pressure chamber 464 is fluidly isolated from the wellbore 304, and the high-pressure chamber 462 is fluidly connected with the wellbore 304. A piston 470 may be slidably disposed within the high-pressure chamber 462, such as may divide the high-pressure chamber 462 to form a first portion 466 and a second portion 468. An upper surface 472 of the piston 470 may form a movable boundary that partially defines the first portion 466, and a lower surface 474 of the piston 470 may form a movable boundary that partially defines the second portion 468. The second portion 468 of the high-pressure chamber 462 may be in fluid communication with or otherwise open to the wellbore 304, such as via a port 469, while the first portion 466 of the high-pressure chamber 462 may be isolated from the wellbore 304 by the piston 470. However, because the lower surface 474 of the piston 470 may be in fluid communication with the wellbore 304, and because the piston 470 is free to slide axially within the high-pressure chamber 462, the fluid within the first portion 466 of the high-pressure chamber 462 remains substantially the same as the pressure of fluid within the wellbore 304.

A valve 482 may be configurable between a first position (shown in FIGS. 4 and 6), fluidly coupling the first working chamber 444 with the low-pressure chamber 464, and a second position (shown in FIGS. 5 and 7), fluidly coupling the first working chamber 444 with the high-pressure chamber 462. A valve 484 may be configurable between a first position (shown in FIGS. 4 and 7), fluidly coupling the third working chamber 448 with the high-pressure chamber 462, and a second position (shown in FIGS. 5 and 6), fluidly coupling the third working chamber 448 with the low-pressure chamber 464. The valves 482 and 484 may be or comprise various numbers and/or types of valves and/or other hydraulic circuitry, and/or may include one or more two-position valves, three-position valves, directional control valves, check valves, piloted valves, and/or other types of valves and/or other hydraulic circuitry.

One or more flowlines and/or other fluid pathways 492 fluidly couple the first working chamber 444 to a selective one of the high- and low-pressure chambers 462 and 464 via the valve 482 and/or other hydraulic circuitry. Similarly, one or more flowlines and/or other fluid pathways 494 fluidly couple the third working chamber 448 to a selective one of the high- and low-pressure chambers 462 and 464 via the valve 484 and/or other hydraulic circuitry. One or more flowlines and/or other fluid pathways 496 may also fluidly couple the second working chamber 446 to the low-pressure chamber 464. The pump assembly 402 may comprise additional fluid pathways, including those shown but not numbered in FIGS. 4-7, among others.

One or more of the first working chamber 444, the second working chamber 446, the third working chamber 448, the high-pressure chamber 462, and the low-pressure chamber 464 may comprise nitrogen, argon, air, hydraulic fluid (e.g., hydraulic oil), and/or another gaseous or liquid fluid, collectively referred to below as working fluid 490. The pressure within the high-pressure chamber 462 may substantially remain at or near hydrostatic pressure due to the piston 470 being in fluid communication with the wellbore 304. The low-pressure chamber 464 may initially have an internal pressure that is substantially atmospheric and/or otherwise less than the initial (e.g., wellbore) pressure of the high-pressure chamber 462. The piston 420, the chambers 442, 444, 446, 448, 462, 464, and the associated hydraulic circuitry, may collectively form a pump that may be utilized for various pumping operations described herein. For example, the piston 420 may be reciprocated by alternately exposing its surfaces to the high and low pressures of the high-pressure chamber 462 and the low-pressure chamber 464, respectively, via operation of the valves 482 and 484.

The pump assembly 402 is shown comprising two "power" chambers, the first working chamber 444 and the third working chamber 448, which may be utilized individually or together to impart a pumping motion to the piston 420. The pressure differential (e.g., overbalance+drawdown) that may be generated in the pressure chamber 442 with respect to the hydrostatic pressure of the wellbore 304 during an inlet stroke depends on the amount of the area of the piston 420 that is exposed to the low-pressure chamber 464. By sizing the upper and lower pistons 422, 424 differently, three differential pressure ratios may be possible: the pressure applied to the lower surface 434 of the upper piston 422 (hereinafter referred to as "P1"), the pressure applied to the lower surface 438 of the lower piston 424 (hereinafter referred to as "P2"), and the combined application of these two pressures (hereinafter referred to as "P1+P2"). For example, the difference between the two pressure differentials P1 and P2 may be at least partially attributable to the area of the lower surface 434 of the upper piston 422 being smaller than the area of the lower surface 438 of the lower piston 424. Accordingly, the surface operator, surface controller, and/or controller of the downhole tool 400 may utilize a pressure differential operable to perform operations as described herein. The choice of which power chamber(s) to utilize may be made during the job based on observation of pressures and flow rates.

Figure 4:
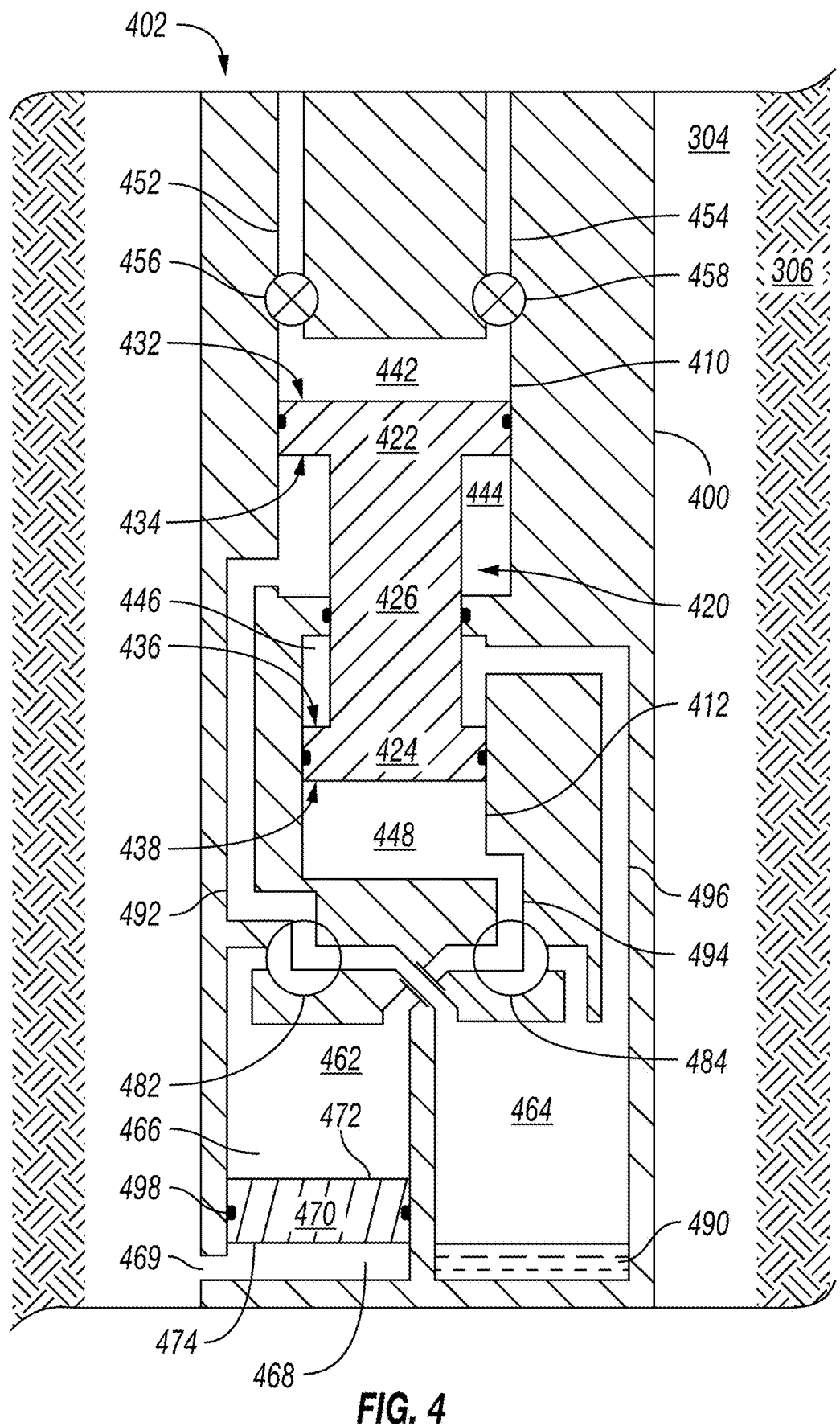
FIG. 4 is a schematic view of a portion of an example implementation of the apparatus shown in FIGS. 1-3 according to one or more aspects of the present disclosure.

FIG. 4 depicts an inlet stroke of the piston assembly 420 utilizing "low power" corresponding to the smallest of the pressure differentials P1. That is, the valves 482 and 484 are operated to fluidly connect the first working chamber 444 to the low-pressure chamber 464, and to fluidly connect the third working chamber 448 to the high-pressure chamber 462. This low power mode may be the most economical mode in terms of consumption of the working fluid 490, relative to the medium and high power modes described below. For example, the amount of working fluid 490 displaced into the low-pressure chamber 464 is the least compared to the medium and high power modes, however, the suction differential generated in the low power mode is also the lowest.

Figure 5:
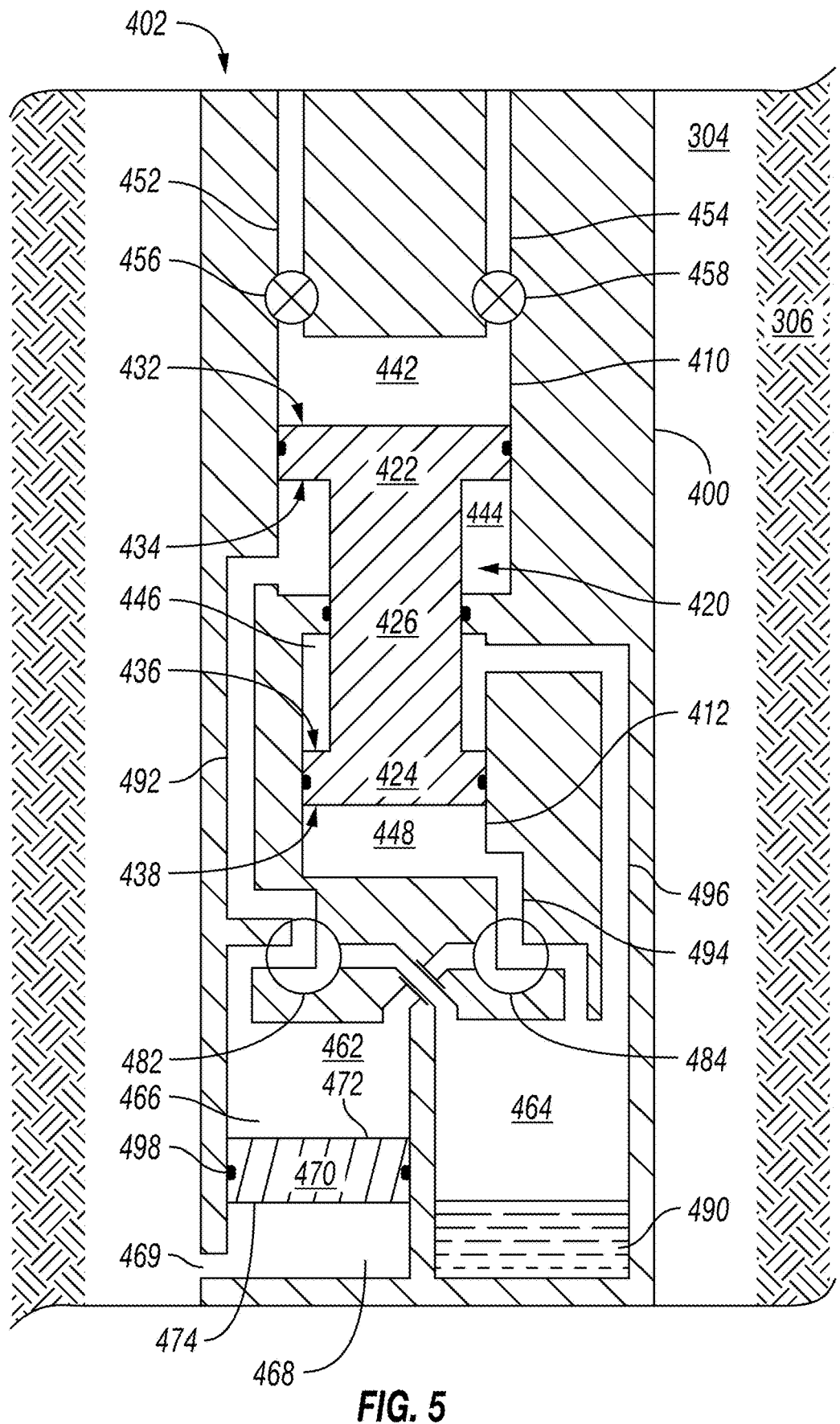
FIG. 5 is a schematic view of the apparatus shown in FIG. 4 according to one or more aspects of the present disclosure.

FIG. 5 depicts an inlet stroke of the piston assembly 420 utilizing "medium power" corresponding to the median of the pressure differentials P2. That is, the valves 482 and 484 are operated to fluidly connect the first working chamber 444 to the high-pressure chamber 462, and to fluidly connect the third working chamber 448 to the low-pressure chamber 464. Thus, the larger of the power chambers (i.e., the third working chamber 448) may be utilized to create a moderate suction differential pressure. The medium power mode, however, displaces more working fluid 490 into the low-pressure chamber 464 relative to the low power mode depicted in FIG. 4.

Figure 6:
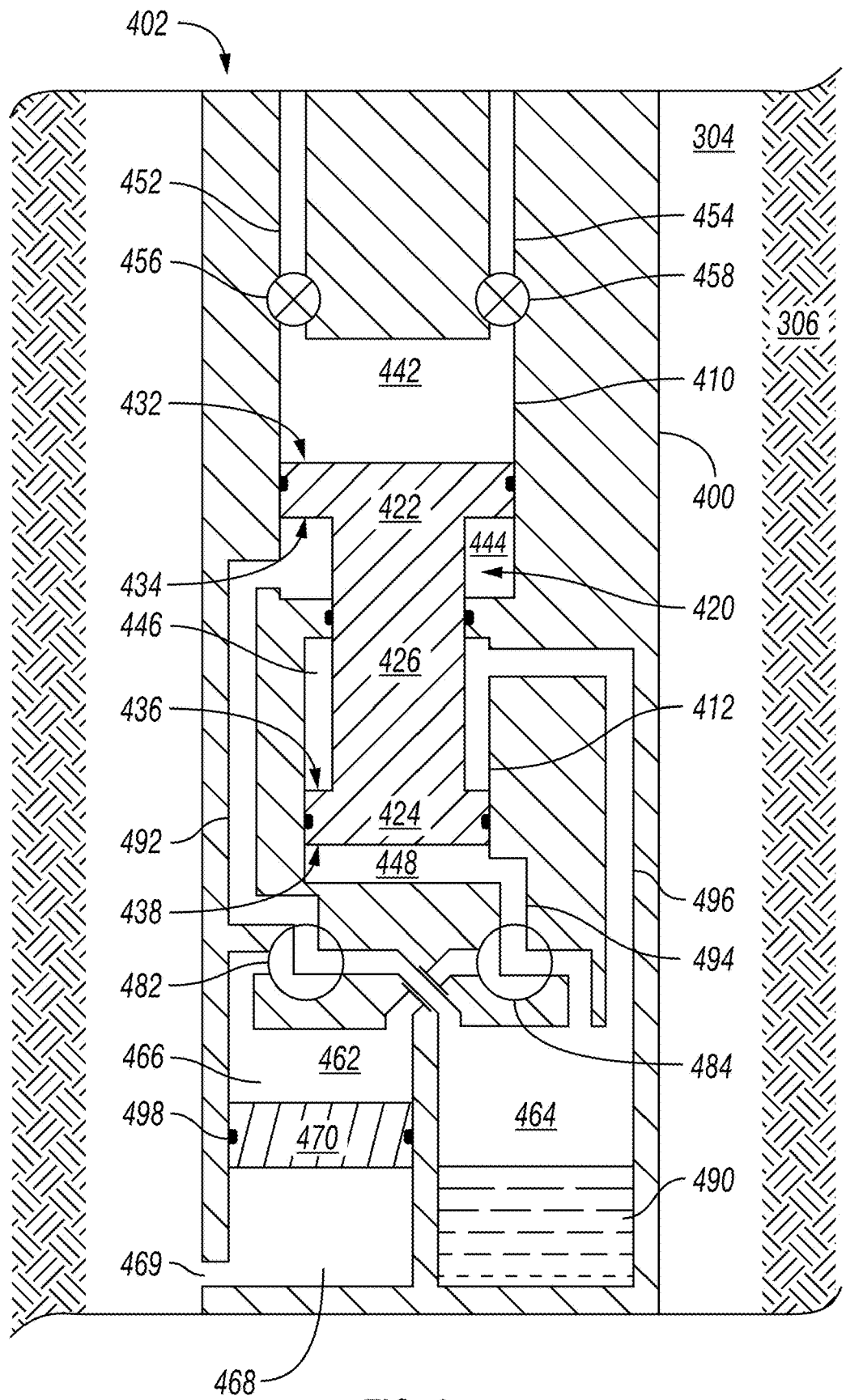
FIG. 6 is a schematic view of the apparatus shown in FIGS. 4 and 5 according to one or more aspects of the present disclosure.

FIG. 6 depicts an inlet stroke of the piston assembly 420 utilizing "high power" corresponding to the largest of the pressure differentials P1+P2. That is, the valves 482 and 484 are operated to fluidly connect the first working chamber 444 and the third working chamber 448 to the low-pressure chamber 464. Thus, relative to the low and median power modes, the high power mode generates the most suction differential, but also displaces the most working fluid 490 into the low-pressure chamber 464.

Figure 7:
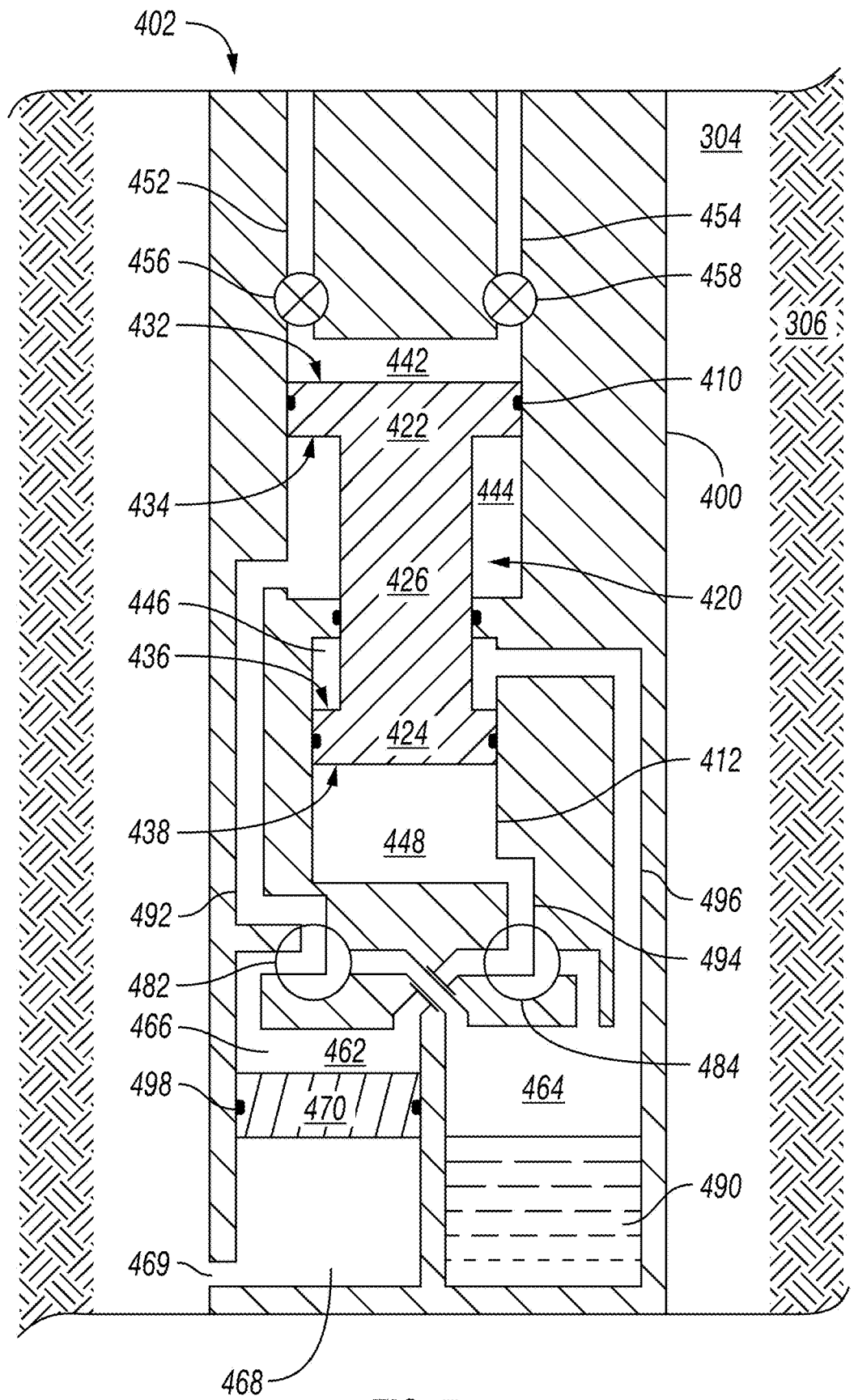
FIG. 7 is a schematic view of the apparatus shown in FIGS. 4-6 according to one or more aspects of the present disclosure.

In each of the power modes depicted in FIGS. 4-6, the suction stroke is followed by substantially the same exhaust stroke, as depicted in FIG. 7. That is, the valves 482 and 484 are operated to fluidly connect the first working chamber 444 and the third working chamber 448 to the high-pressure chamber 462. Accordingly, the pressure in the second working chamber 446, which is in constant fluid communication with the low-pressure chamber 464, imparts the return movement of the piston 420.

This alternating process may be repeated as intended, with each iteration transferring a portion of the contents of the high-pressure chamber 462 to the low-pressure chamber 464. Thus, after a finite number of strokes of the piston assembly 420, the pressures in the high- and low-pressure chambers 462, 464 and the working chambers 444, 446, 448 will equalize. Consequently, the pump assembly 402 may not be able to operate for a prolonged period of time without at least partially filling the first portion 466 of the high-pressure chamber 462 and/or evacuating the low-pressure chamber 464, which may be performed downhole or at surface.

A person having ordinary skill in the art will recognize that the example implementation depicted in FIGS. 4-7 (among others within the scope of the present disclosure) may not be limited to two "power" chambers, and that many more permutations may be possible with additional power chambers. For example, a stepped piston with four power chambers (via two surfaces facing uphole and two surfaces facing downhole in their respective chambers) may be dimensioned and/or otherwise configured to yield twelve different suction differentials and three different exhaust differentials. Such embodiments may provide finer granularity in the choice of a suction differential compatible with formation strength and sample quality, together with a further reduction in consumption of on-board working fluid.

A person having ordinary skill in the art will also readily recognize that, in the implementations explicitly described herein and others within the scope of the present disclosure, various isolation features, sealing members, and/or other means 498 may be utilized for isolation of various chambers (e.g., chambers 442, 444, 446, 448, 462, 464). Such means 498 may include, for example, O-rings, wipers, gaskets, and/or other seals within the scope of the present disclosure, and may be manufactured from one or more rubber, silicon, elastomer, copolymer, metal, and/or other materials. Examples of such means 498 are depicted in FIGS. 4-7 as being O-rings of substantially circular cross-section installed in respective glands, grooves, recesses, and/or other features of first and/or second adjacent components to form a face seal between the first and second components. However, a person having ordinary skill in the art will readily recognize how such means 498 may be mechanically integrated into the various apparatus described above in other manners also within the scope of the present disclosure.

Figure 8:
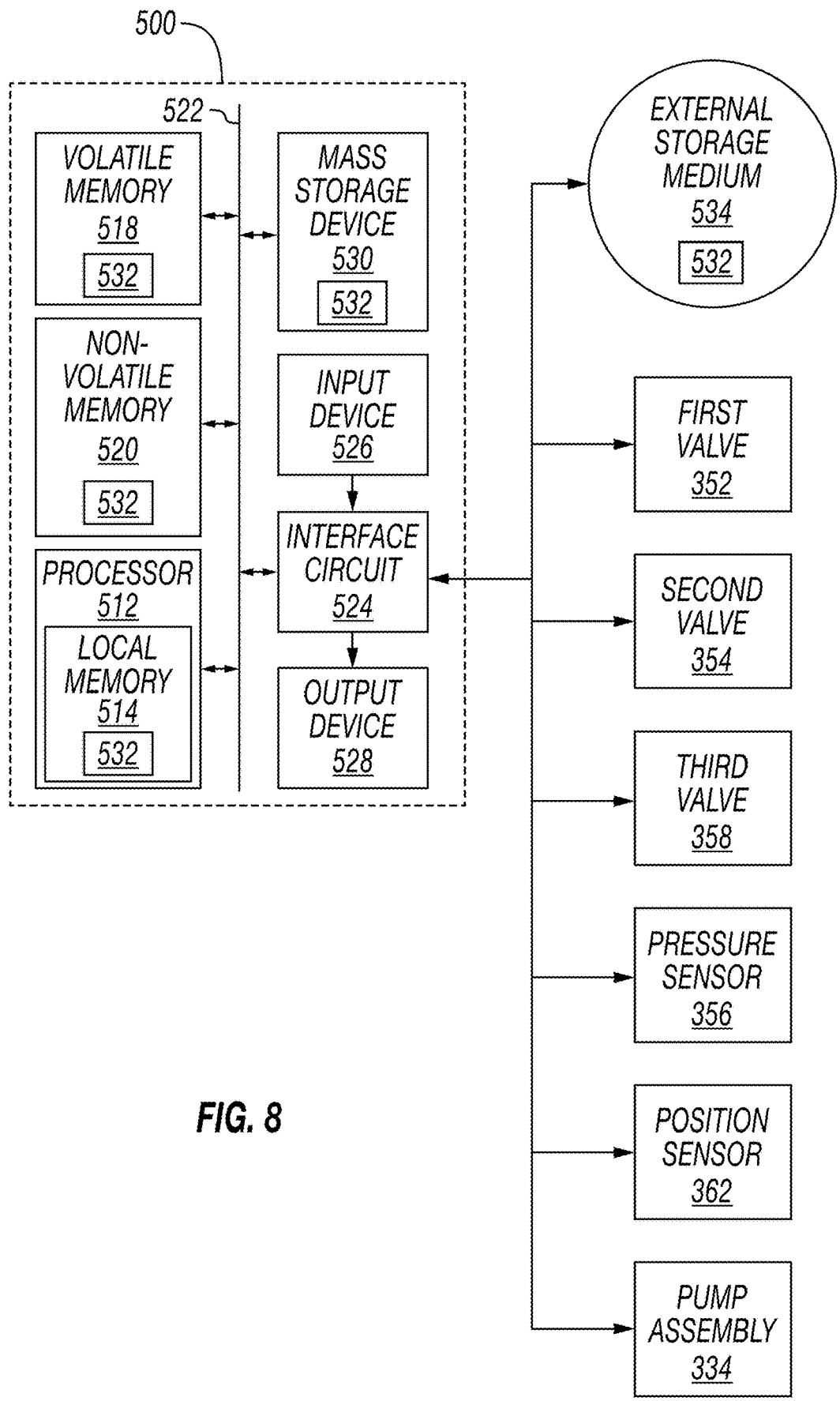
FIG. 8 is a schematic view of a portion of an example implementation of the apparatus shown in FIGS. 1-3 according to one or more aspects of the present disclosure.

FIG. 8 is a schematic view of at least a portion of an example implementation of a controller 500 according to one or more aspects of the present disclosure. The controller 500 may be implemented as at least part of one or more of the control and/or processing systems 112, 106, 220, 221 described above, such as for controlling the valves 352, 354, 358, the pressure sensor 356, the position sensor 362, the pump assembly 334, and/or other portions of the downhole tool 300 shown in FIG. 3, the valves 456, 458, 482, 484 shown in FIG. 4, and/or other controlled devices shown in one or more of FIGS. 1-7, described above, and/or otherwise within the scope of the present disclosure. Such devices of one or more of the downhole tools 100, 200, 300, 400 described above and/or otherwise within the scope of the present disclosure are collectively referred to hereinafter as the "controlled devices."

Control signals may be communicated between the controller 500 and the controlled devices via corresponding electrical conductors or cables (not shown). However, other means of signal communication, such as wireless communication, are also within the scope of the present disclosure. The following description refers to FIGS. 3 and 8, collectively.

The controller 500 may be or comprise, for example, one or more processors, general- or special-purpose computing devices, servers, personal computers, personal digital assistant (PDA) devices, smartphones, internet appliances, and/or other types of computing devices. The controller 500 may comprise a processor 512, such as a general- or specific-purpose programmable processor. The processor 512 may comprise a local memory 514, and may execute coded instructions 532 present in the local memory 514 and/or another memory device. The coded instructions 532 may include machine-readable instructions or programs to implement the methods and/or processes described herein. For example, the coded instructions 532 may include program instructions or computer program code that, when executed by an associated processor, facilitate the controlled devices to perform methods and/or processes described herein. The processor 512 may be, comprise, or be implemented by one or a plurality of processors of various types suitable to the local application environment, and may include one or more of general- or special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 512 may be in communication with a main memory, which may include a volatile memory 518 and a non-volatile memory 520, and such communication may be via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by read-only memory, flash memory, and/or other types of memory devices. One or more memory controllers (not shown) may control access to the volatile memory 518, the non-volatile memory 520, and/or other main memory. The controller 500 may be operable to store or record the signals or information sent to and/or received from the controlled devices on the main memory.

The controller 500 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, and/or a cellular interface, among others. The interface circuit 524 may also comprise a graphics driver card. The interface circuit 524 may also comprise a communication device, such as a modem or network interface card to facilitate the exchange of data with external computing devices via a network (e.g., Ethernet connection, digital subscriber line (DSL), telephone line, coaxial cable, cellular telephone system, satellite, etc.). The controlled devices may be connected with the controller 500 via the interface circuit 524, such as may facilitate communication between the controlled devices and the controller 500.

One or more input devices 526 may also be connected to the interface circuit 524. The input devices 526 may permit the surface operator to enter data and/or commands into the processor 512. The input devices 526 may be, comprise, or be implemented by a keyboard, a mouse, a touchscreen, a track-pad, a trackball, an isopoint, and/or a voice recognition system, among other examples. One or more output devices 528 may also be connected to the interface circuit 524. The output devices 528 may be, comprise, or be implemented by display devices (e.g., a liquid crystal display (LCD) or cathode ray tube display (CRT), among others), printers, and/or speakers, among other examples.

The controller 500 may also comprise one or more mass storage devices 530 for storing machine-readable instructions and data. Examples of such mass storage devices 530 include floppy disk drives, hard drive disks, compact disk (CD) drives, and digital versatile disk (DVD) drives, among others. The coded instructions 532 may be stored in the mass storage device 530, the volatile memory 518, the non-volatile memory 520, the local memory 514, and/or a removable storage medium 534, such as a CD or DVD. Thus, the controller 500 may be implemented in accordance with hardware (embodied in one or more chips including an integrated circuit, such as an application specific integrated circuit), or may be implemented as software or firmware for execution by a processor. In the case of firmware or software, the implementation may be provided as a computer program product including a computer readable medium or storage structure embodying computer program code (i.e., software or firmware) thereon for execution by the processor 512. The coded instructions 532 may include program instructions or computer program code that, when executed by the processor 512, cause the controller 500 to perform methods and processes as described herein.

Each pump cycle (i.e., back and forth motion of the piston 340) of the pump assembly 334 may comprise a fluid suction phase during which fluid is drawn into the downhole tool 300 from the formation 306. Accordingly, the coded instructions 532, when executed, may cause the controller 500 to open the valve 352, close the valve 354, and operate the pump assembly 334 to increase the volume of the pressure chamber 336 and thereby draw fluid from the formation 306 into the pressure chamber 336 via the probe assembly 320, the fluid inlet 332, the inlet fluid pathway 344, the valve 352, and the common fluid pathway 342.

One difference between the native formation fluid 316 and drilling fluid is that the native formation fluid 316 may comprise dissolved gas in a solution (i.e., liquid) form, while drilling fluid does not comprise dissolved gas because it is exposed to the ambient environment at surface prior to being pumped downhole. The gas in the native formation fluid 316 may be released by depressurizing the fluid as (or after) it is drawn into the downhole tool 300. Therefore, the coded instructions 532, when executed, may further cause the controller 500 to operate the pumping system 302 and/or other portions of the downhole tool 300 to determine and/or monitor the compressibility of the fluid within the pressure chamber 336 to differentiate between the native formation fluid 316 and drilling fluid.

Figure 9:
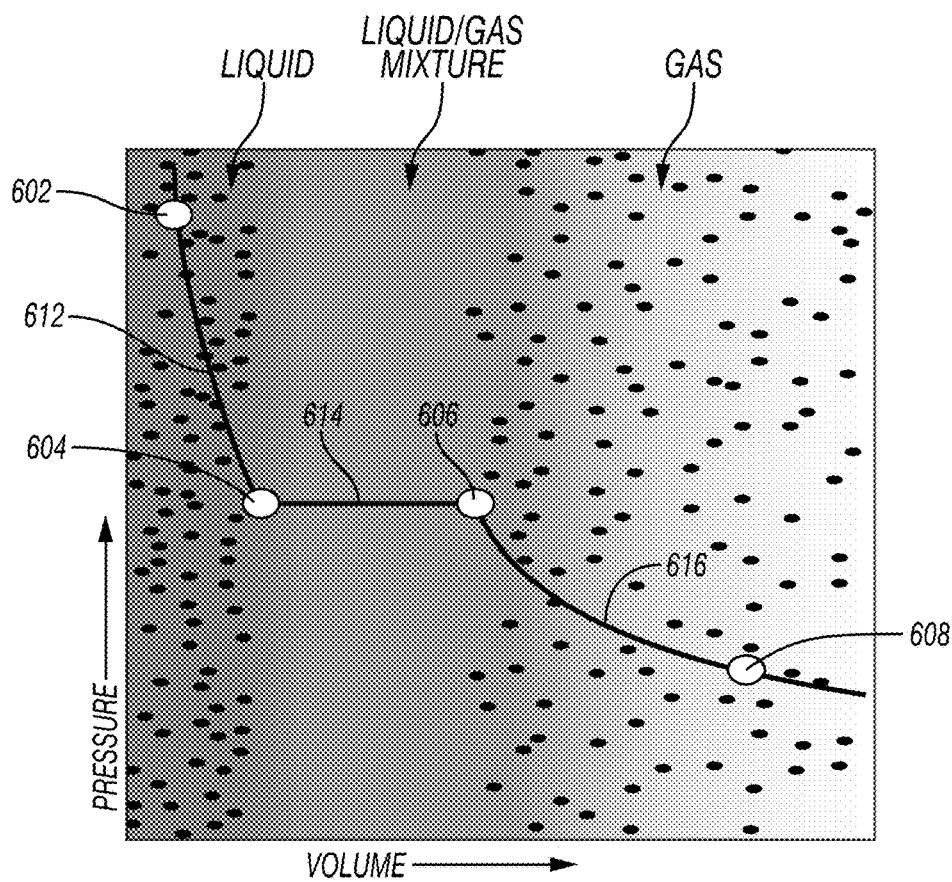
FIG. 9 is a graph related to one or more aspects of the present disclosure.
Figure 10:
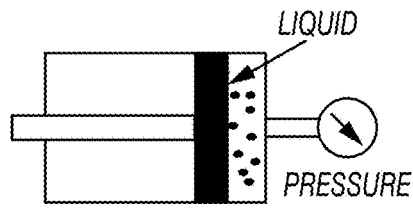
FIGS. 10-13 are schematic views of an apparatus related to one or more aspects of the present disclosure at successive stages of operation.
Figure 11:
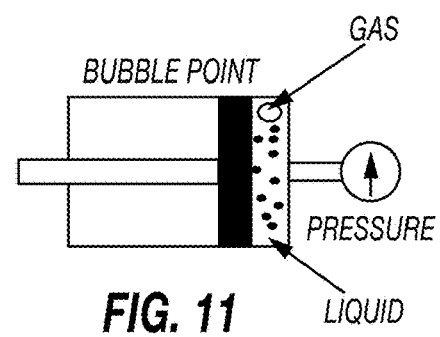
Figure 12:
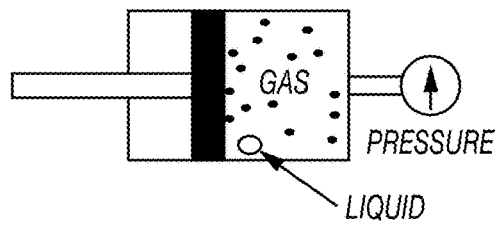
Figure 13:

FIG. 9 is a graph related to one or more aspects of the present disclosure, showing an example relationship between pressure and volume of an example fluid transitioning from liquid to gas phase as the fluid is being depressurized. FIGS. 10-13 are schematic diagrams related to one or more aspects of the present disclosure, showing incremental volumetric changes of an example pressure chamber (such as the pressure chamber 336 shown in FIG. 3) as the fluid is being depressurized. The following description refers to FIGS. 9-13, collectively.

When the fluid is in pure liquid phase, pressure changes rapidly with respect to small changes in volume. Such relationship is depicted in FIG. 9 by curve portion 612 extending between point 602 and the bubble point 604, which depicts a large change in pressure relative to a small change in volume. The relationship is further demonstrated by comparing FIGS. 10 and 11, which represent points 602, 604, respectively, and which depict a large decrease in pressure during a comparatively small increase in volume.

When the fluid comprises a mixture of liquid and free gas, the pressure remains substantially unchanged while the volume changes. Such relationship is depicted in FIG. 9 by curve portion 614 extending between the bubble point 604 and the dew point 606, during which the pressure remains substantially unchanged as the volume changes. This relationship is further demonstrated by comparing FIGS. 11 and 12, which represent points 604, 606, respectively, and which depict little or no change in pressure during a comparatively large increase in volume.

When the fluid is in pure gas phase, pressure changes slowly with respect to large changes in volume. Such relationship is depicted in FIG. 9 by curve portion 616 extending between the dew point 606 and point 608, which depicts a small change in pressure relative to a large change in volume. The relationship is further demonstrated by comparing FIGS. 12 and 13, which represent points 606, 608, respectively, and which depict a small decrease in pressure during a comparatively large increase in volume.

Referring again to FIGS. 3 and 8, during the fluid suction phase, the fluid drawn into the pressure chamber 336 may be depressurized by reducing the pressure of the fluid within the pressure chamber 336 above the bubble point of the gas in solution within the fluid. Therefore, the controller 500 may be further operable to increase the flow rate of the pump assembly 334 to a higher value than what the formation 306 is capable of producing, such as by increasing the rate of volumetric expansion of the pressure chamber 336. If the fluid in or being drawn into the pressure chamber 336 comprises the native formation fluid 316, the solution-dissolved gas therein may be released from solution, such that the pressure chamber 336 will then be occupied by a mixture of liquid and gas. The amount of gas released may depend on the properties of the native formation fluid 316 and/or the extent to which the pressure within the pressure chamber 336 was below the bubble point pressure.

During or after the fluid suction phase, the controller 500 may be operable to further depressurize the fluid sample by closing both valves 352, 354 and operating the pump assembly 334 to further increase the volume of the pressure chamber 336, thus further depressurizing the pressure chamber 336 and, therefore, releasing additional gas from the fluid therein. For example, the pressure within the pressure chamber 336 may be decreased to a predetermined level, which may comprise a pressure ranging between about the formation pressure and about the bubble point pressure of the solution gas trapped within the fluid in the pressure chamber 336. However, the predetermined pressure drop may be to lower than the bubble point pressure of the solution gas, such as to a pressure ranging between about the bubble point pressure and about the atmospheric pressure at surface.

Each pump cycle may further comprise a fluid ejection phase during which the fluid drawn from the formation 306 is ejected from the downhole tool 300 into the wellbore 304. Accordingly, the controller 500 may be further operable to close the valve 352, open the valve 354, and operate the pump assembly 334 to decrease the volume of the pressure chamber 336 and thereby discharge fluid from the pressure chamber 336 into the wellbore 304 via the outlet fluid path 346 and the fluid outlet 348.

The native formation fluid 316 may be distinguished from drilling fluid by pressurizing the fluid within the pressure chamber 336 and monitoring the relationship (e.g., ratio, rate of change) (referred to hereinafter as a "compressibility ratio") of the pressure increase with respect to the change in the volume of the pressure chamber 336 to detect the presence of gas and, thus, native formation fluid 316 within the fluid sample. The compressibility ratio may be determined utilizing Equation (1) set forth below:

$$\text{Compressibility Ratio} = \frac{\Delta \text{ Pressure}}{\Delta \text{ Volume}} \quad (1)$$

wherein Δ Pressure denotes change in pressure of the fluid within the pressure chamber 336 and Δ Volume denotes change in volume of the pressure chamber 336 corresponding to the change in pressure. Accordingly, during the fluid ejection phase, the fluid previously drawn into the pressure chamber 336 may be pressurized as the fluid is ejected from the downhole tool 300 via operation of the valve 354. For example, if the valve 354 comprises the check valve described above, the check valve will facilitate pressure increase or build-up within the pressure chamber 366 to pressurize the fluid being ejected. The check valve may automatically open when the pressure of the fluid within the pressure chamber 336 reaches the set pressure of the check valve, thus permitting the fluid to be discharged from the pressure chamber 336 under pressure.

If the valve 354 comprises a shut-off valve, the controller 500 may be operable to close both valves 352, 354 and operate the pump assembly 334 to decrease the volume of the pressure chamber 336 to pressurize the fluid therein, whether during or before the ejection phase. By utilizing a shut-off valve, the fluid may be pressurized to a predetermined pressure level, which may include pressures up to the maximum operating pressure of the pump assembly 334.

Accordingly, to differentiate between the native formation fluid 316 and drilling fluid, the coded instructions 532, when executed, may cause the controller 500 to receive, process, and/or record the signals or information from the position and pressure sensors 362, 356 to determine and/or monitor the compressibility ratio of the fluid drawn from the formation 306. The compressibility ratio generated or otherwise determined by the controller 500 or another portion of the system may be indicative of the presence of drilling fluid and, thus, contamination of the fluid obtained from the formation 306. The compressibility ratio may be further indicative of the amount of contamination within the fluid obtained from the formation 306, wherein a greater compressibility ratio may be indicative of a greater percentage of contamination, while a smaller compressibility ratio may be indicative of a smaller percentage of contamination. Also, changes between compressibility ratios determined at different times may be indicative of changes in the amount of contamination within the fluid obtained from the formation 306, wherein an increase in the compressibility ratio may be indicative of an increase in contamination, while a decrease in the compressibility ratio may be indicative of an increase in percentage of the native formation fluid 316 (i.e., decrease in contamination) in the fluid obtained from the formation 306.

To differentiate between the native formation fluid 316 and drilling fluid within the fluid obtained from the formation 306, the coded instructions 532, when executed, may further cause the controller 500 to receive a threshold compressibility ratio and to compare the measured compressibility ratio to the threshold compressibility ratio to determine the amount of drilling fluid/contamination within the fluid sample. The threshold compressibility ratio may be a predetermined value universally applied to various drilling fluids, or the threshold compressibility ratio may be determined based on properties of the specific drilling fluid utilized when forming the wellbore 304 and/or properties of the native formation fluid 316 predicted or otherwise determined to be contained within the formation 306. The compressibility ratios generated or otherwise determined by the controller 500 or another portion of the system may be compared with the threshold compressibility ratio to further determine the contamination of the fluid obtained from the formation 306.

For example, if the generated compressibility ratio is greater than the threshold compressibility ratio, the fluid obtained from the formation 306 may be determined to substantially comprise drilling fluid and/or otherwise substantially not comprising native formation fluid 316. Also, when the fluid drawn from the formation 306 is pressurized and the pressure increases quickly to reach the predetermined pressure while the volume of the pressure chamber 336 decreases a small amount, the fluid obtained from the formation 306 may be determined to substantially comprise drilling fluid and/or otherwise not substantially comprise native formation fluid 316.

When the fluid obtained from the formation 306 is pressurized and the pressure remains substantially constant while the volume of the pressure chamber 336 decreases (similarly as shown by the curve portion 614 in FIG. 9), such behavior may indicate that gas may be returning into solution. Under such circumstances, the fluid obtained from the formation 306 may be determined to substantially comprise native formation fluid 316.

If the generated compressibility ratio is less than the threshold compressibility ratio, the fluid obtained from the formation 306 may be determined to at least partially comprise gas and, thus, at least partially comprise native formation fluid 316. If the generated compressibility ratio is less than the threshold compressibility ratio, and when the fluid obtained from the formation 306 is pressurized and the pressure within the pressure chamber 336 reaches the predetermined pressure (e.g., maximum operating pressure of the pump, check valve set pressure) before the volume of the pressure chamber 336 stops decreasing (such as at the end of the stroke of the piston 340), the fluid obtained from the formation 306 may be determined to at least partially comprise gas and, thus, at least partially comprise native formation fluid 316.

Furthermore, if the generated compressibility ratio is less than the threshold compressibility ratio, and when the fluid obtained from the formation 306 is pressurized and the pressure within the pressure chamber 336 reaches the predetermined pressure at about the same time as the volume of the pressure chamber 336 stops decreasing, the fluid obtained from the formation 306 may be determined to substantially comprise gas and, thus, substantially comprise native formation fluid 316. Also, if the generated compressibility ratio is less than the threshold compressibility ratio, and when the fluid obtained from the formation 306 is pressurized and the pressure within the pressure chamber 336 does not reach the predetermined pressure when the volume of the pressure chamber 336 stops decreasing, the fluid obtained from the formation 306 may also be determined to substantially comprise gas and, thus, substantially comprise native formation fluid 316.

The controller 500 may be further operable to run the downhole tool 300 in a pumping (i.e., cleanup) mode and a sampling mode. In the pumping mode, the pump assembly 334 may move the fluid obtained from the formation 306 into the downhole tool 300 through the probe assembly 320, through the inlet flow path 344, into the pressure chamber 336, and then out of the downhole tool 300 through the outlet port 348, as described above. During the pumping mode, the controller 500 may be operable to monitor the generated compressibility ratio to monitor the progress of the cleanup operation. The downhole tool 300 may be operated in the pumping mode until the fluid drawn into the pressure chamber 336 is determined to be sufficient clean to collect a representative sample. That is, when fluid is first pumped from the formation 306, drilling fluid forced into the formation 306 via the drilling operations may enter the downhole tool 300 along with the native formation fluid 316. After pumping for a sufficient amount of time, the fluid flowing through the downhole tool 300 may provide a cleaner sample than is available when first pumping fluid into the downhole tool 300.

Accordingly, in the pumping mode, the controller 500 may cause the downhole tool 300 to undergo the fluid suction and ejection phases described above under substantially the same or similar parameters (e.g., volumetric flow rate) and at predetermined intervals, such as may be selected by the surface operator or otherwise. The controller 500 may further log the generated compressibility ratio during each ejection phase or another phase during which the obtained fluid is pressurized, wherein successively generated compressibility ratios may be indicative of the progress of the cleanup operation. For example, when consecutively generated compressibility ratios are changing (i.e., decreasing), such changes may indicate an increasing percentage of native formation fluid 316 (i.e., decreasing percentage of contamination) within the fluid during each subsequent fluid ejection phase. As the differences between consecutively generated compressibility ratios reach steady state, or become smaller than a predetermined magnitude, the quality of the fluid being obtained from the formation 306 may be determined to have reached steady state (i.e., is not improving) and the pumping mode may be terminated.

The sampling mode may then commence. For example, the controller 500 may actuate the valves 352, 354 to the closed position, and the valve 358 to the open position, thus permitting the fluid in the pressure chamber 336 to be directed into the sample chamber 360. The valve 358 may then be closed to capture the representative sample.

Although the compressibility ratio is defined above as the change in pressure of the fluid within the pressure chamber 336 with respect to the change in volume of the pressure chamber 336, the compressibility ratio may be reversed and, thus, defined as the change in volume of the pressure chamber 336 with respect to the change in pressure of the fluid within the pressure chamber 336. If the reversed compressibility ratio is utilized within the scope of the present disclosure, the corresponding contamination determination and/or calculation process will also be reversed. For example, when utilizing the reversed compressibility ratio, an increase in the reversed compressibility ratio may be indicative of a decrease in percentage of drilling fluid (i.e., decrease in contamination) in the fluid obtained from the formation 306, and a decrease in the reversed compressibility ratio may be indicative of a decrease in the percentage of native formation fluid 316 (i.e., increase in contamination) in the fluid obtained from the formation 306.

Because the pumping system 302, the downhole tool 300, and/or other portions of the wellsite systems 101, 201 may be operable to monitor the level of contamination of fluid obtained from the formation 306 without utilizing fluid identification sensors (e.g., a spectrometer, a fluorescence sensor, an optical fluid analyzer, a density and/or viscosity sensor, etc.) that may comprise temperature-sensitive electronic components, the downhole tool 300 may be operable in high-temperature wellbore environments. For example, the downhole tool 300 may be operated, as described above, in temperatures up to about 230° Celsius, or higher.

Figure 14:
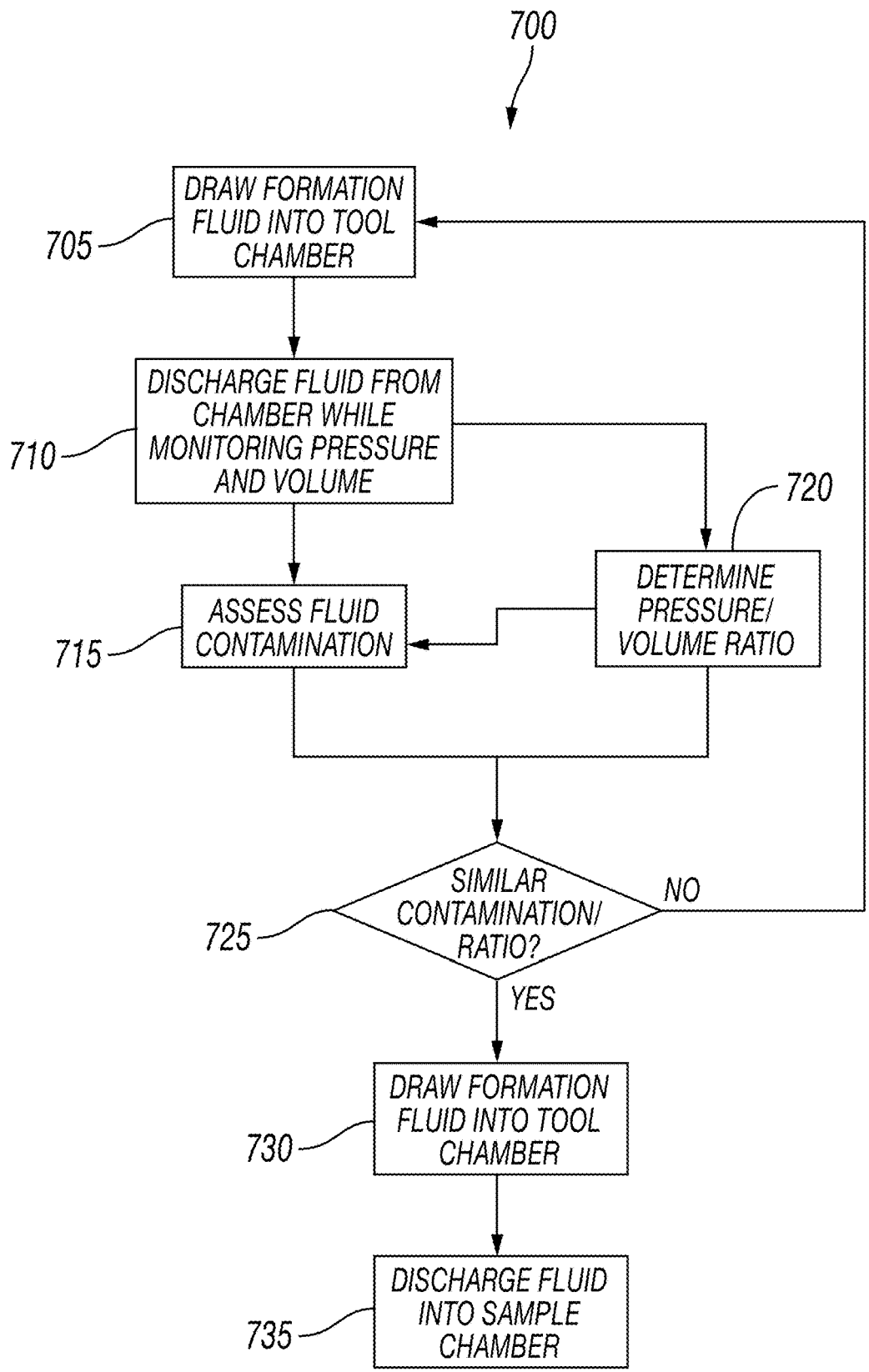
FIG. 14 is a flow-chart diagram of at least a portion of an example implementation of a method according to one or more aspects of the present disclosure.

FIG. 14 is a flow-chart diagram of at least a portion of an example implementation of a method (700) according to one or more aspects of the present disclosure. The method (700) may be performed utilizing at least a portion of one or more implementations of the apparatus shown in one or more of FIGS. 1-13 and/or otherwise within the scope of the present disclosure.

The method (700) comprises operating (705) a downhole sampling tool to draw fluid from a subterranean formation into a chamber of the downhole sampling tool. The downhole sampling tool may have one or more aspects in common with one or more of the downhole tools 100, 200, 300, 400 described above and/or other downhole tools within the scope of the present disclosure. Operating (705) the downhole sampling tool to draw fluid from the subterranean formation into the chamber may include decreasing pressure within the chamber to below a bubble point pressure of solution gas in the fluid. Operating (705) the downhole sampling tool to draw fluid from the subterranean formation into the chamber may also or instead comprise operating the downhole sampling tool to increase the volume of the chamber at a rate sufficient to decrease pressure in the chamber to below a formation pressure of fluid contained within the subterranean formation.

Operating (705) the downhole sampling tool to draw fluid from the subterranean formation into the chamber may also or instead comprise increasing volume of the chamber during a period of time, and restricting flow of fluid drawn from the subterranean formation into the chamber during at least a portion of the period of time. Restricting the flow of fluid into the chamber may be via a flow control device (e.g., valve 352 in FIG. 3) fluidly connected between the chamber and a probe of the downhole sampling tool that is in fluid communication with the subterranean formation. The flow control device may be a check valve having a set pressure substantially greater than a formation pressure of fluid contained within the subterranean formation. In implementations in which the flow control device is or comprises a valve, restricting the flow of fluid into the chamber may comprise closing the valve.

The downhole sampling tool is then operated (710) to discharge the fluid from the chamber while monitoring pressure of the fluid and volume of the chamber. Operating (710) the downhole sampling tool to discharge the fluid from the chamber may direct the discharged fluid through a fluid path between the chamber and a wellbore in which the downhole sampling tool is disposed adjacent the subterranean formation. For example, the fluid path may include a valve, wherein the valve is closed when operating (705) the downhole sampling tool to draw fluid from the subterranean formation into the chamber, and the valve is open when operating (710) the downhole sampling tool to discharge the fluid from the chamber. The valve may be a check valve having a set pressure that is substantially greater than a wellbore pressure of fluid within the wellbore surrounding the downhole sampling tool, such that the monitored fluid pressure ultimately exceeds the wellbore pressure before the fluid discharged from the chamber is transmitted through the check valve to the wellbore.

Contamination of the discharged fluid is assessed (715) based on the monitored fluid pressure and the monitored chamber volume. For example, the method (700) may further comprise determining (720) a ratio between the monitored fluid pressure and the monitored chamber volume, and assessing (715) the contamination of the discharged fluid may be based on the determined (720) ratio. As described above, the determined (720) ratio may be qualitatively proportional to the contamination.

Assessing (715) contamination may also or instead comprise determining a rate of an increase of the monitored fluid pressure relative to a decrease of the monitored chamber volume, and comparing the determined rate to a predetermined threshold. For example, assessing (715) contamination may comprise, if the determined rate is greater than the predetermined threshold, determining that the discharged fluid substantially comprises drilling fluid and substantially doesn't comprise native formation fluid, but determining that the discharged fluid at least partially comprises native formation fluid if the determined rate is less than the predetermined threshold. Assessing (715) contamination may also or instead comprise: if the determined rate is greater than the predetermined threshold, determining that the discharged fluid substantially comprises drilling fluid and substantially doesn't comprise native formation fluid; else, if the monitored fluid pressure remains substantially constant during an intermediate portion of a time period in which the monitored chamber volume is decreasing, determining that the discharged fluid comprises gas that was dissolved in solution before being drawn from the subterranean formation, that escaped solution upon decompression within the chamber, and that is dissolving back into solution during the intermediate portion of the time period; else, if the determined rate is less than the predetermined threshold, and the monitored pressure increases to a predetermined value before the monitored chamber volume stops decreasing, determining that the discharged fluid at least partially comprises native formation fluid that at least partially comprises gas; else, if the determined rate is less than the predetermined threshold, and the monitored pressure increases to the predetermined value at substantially the same time that the monitored chamber volume stops decreasing, determining that the discharged fluid substantially comprises native formation fluid that substantially comprises gas; else, if the determined rate is less than the predetermined threshold, and the monitored pressure does not increase to the predetermined value, determining that the discharged fluid substantially comprises native formation fluid that substantially comprises gas. In such implementations, among others within the scope of the present disclosure, the chamber may be a fluid displacement chamber of a pump, and the predetermined value may be a maximum operating pressure of the pump. Furthermore, operating the downhole sampling tool to discharge the fluid from the chamber may direct the discharged fluid through a fluid path between the chamber and a wellbore in which the downhole sampling tool is disposed adjacent the subterranean formation, and the fluid path may include a check valve having a set pressure that is substantially greater than a wellbore pressure of fluid within the wellbore surrounding the downhole sampling tool, wherein the predetermined value may be the set pressure.

Operating (705) the downhole sampling tool to draw fluid from the subterranean formation into the chamber, operating (710) the downhole sampling tool to discharge the fluid from the chamber while monitoring pressure of the fluid and volume of the chamber, and assessing (715) contamination, collectively, may constitute a cycle, and the method (700) may comprise performing multiple instances of the cycle. Performing each instance of the cycle may further comprise determining (720) the ratio of the fluid pressure and the chamber volume monitored during that cycle, and assessing (715) contamination during the performance of each instance of the cycle may be based on the ratio determined (720) during that cycle and the ratio determined during at least one previous performance of the cycle. The method (700) may further comprise detecting (725) whether the assessed (715) contamination during performance of a cycle is substantially similar to the assessed (715) contamination during the immediately preceding cycle, such as detecting that the ratio determined (720) during performance of a cycle is substantially equal to the ratio determined (720) during the immediately preceding cycle. In the absence of the detection (725) of such substantial similarity and/or equality, another cycle may be performed. When such substantial similarity and/or equality is detected (725), the downhole sampling tool may be operated (730) to again draw fluid from the subterranean formation into the chamber, and the downhole sampling tool may then be operated (735) to discharge the fluid from the chamber into a sample chamber (e.g., chamber 360 shown in FIG. 3) of the downhole sampling tool.

In view of the entirety of the present disclosure, including the figures and the claims, a person having ordinary skill in the art should readily recognize that the present disclosure introduces a method comprising: operating a downhole sampling tool to draw fluid from a subterranean formation into a chamber of the downhole sampling tool; operating the downhole sampling tool to discharge the fluid from the chamber while monitoring pressure of the fluid and volume of the chamber; and assessing contamination of the discharged fluid based on the monitored fluid pressure and the monitored chamber volume.

The method may further comprise determining a ratio between the monitored fluid pressure and the monitored chamber volume, and assessing the contamination of the discharged fluid may be based on the determined ratio. The determined ratio may be qualitatively proportional to the contamination.

Operating the downhole sampling tool to draw fluid from the subterranean formation into the chamber may comprise decreasing pressure within the chamber to below a bubble point pressure of solution gas in the fluid.

Operating the downhole sampling tool to discharge the fluid from the chamber may direct the discharged fluid through a fluid path between the chamber and a wellbore in which the downhole sampling tool is disposed adjacent the subterranean formation. The fluid path may include a valve. The valve may be closed when operating the downhole sampling tool to draw fluid from the subterranean formation into the chamber, and the valve may be open when operating the downhole sampling tool to discharge the fluid from the chamber. The valve may be a check valve having a set pressure that is substantially greater than a wellbore pressure of fluid within the wellbore surrounding the downhole sampling tool, such that the monitored fluid pressure ultimately exceeds the wellbore pressure before the fluid discharged from the chamber is transmitted through the check valve to the wellbore.

Operating the downhole sampling tool to draw fluid from the subterranean formation into the chamber may comprise operating the downhole sampling tool to increase the volume of the chamber at a rate sufficient to decrease pressure in the chamber to below a formation pressure of fluid contained within the subterranean formation.

Operating the downhole sampling tool to draw fluid from the subterranean formation into the chamber may comprise: increasing volume of the chamber during a period of time; and restricting flow of fluid drawn from the subterranean formation into the chamber during at least a portion of the period of time. Restricting the flow of fluid into the chamber may be via a flow control device fluidly connected between the chamber and a probe of the downhole sampling tool that is in fluid communication with the subterranean formation. The flow control device may be a valve, and restricting the flow of fluid into the chamber comprises closing the valve. The flow control device may be a check valve having a set pressure substantially greater than a formation pressure of fluid contained within the subterranean formation.

Operating the downhole sampling tool to draw fluid from the subterranean formation into the chamber, operating the downhole sampling tool to discharge the fluid from the chamber while monitoring pressure of the fluid and volume of the chamber collectively, and assessing contamination, collectively, may constitute a cycle. The method may comprise performing multiple instances of the cycle. Performing each instance of the cycle may further comprise determining a ratio of the fluid pressure and the chamber volume monitored during that cycle. Assessing contamination during the performance of each instance of the cycle may be based on the ratio determined during that cycle and the ratio determined during at least one previous performance of the cycle. Such implementations of the method may further comprise: detecting that the ratio determined during performance of a cycle is substantially equal to the ratio determined during the immediately preceding cycle; and then operating the downhole sampling tool to again draw fluid from the subterranean formation into the chamber; and then operating the downhole sampling tool to discharge the fluid from the chamber into a sample chamber of the downhole sampling tool.

Assessing contamination may comprise: determining a rate of an increase of the monitored fluid pressure relative to a decrease of the monitored chamber volume; and comparing the determined rate to a predetermined threshold. In such implementations, assessing contamination may comprise: if the determined rate is greater than the predetermined threshold, determining that the discharged fluid substantially comprises drilling fluid and substantially doesn't comprise native formation fluid; and determining that the discharged fluid at least partially comprises native formation fluid if the determined rate is less than the predetermined threshold. Assessing contamination may also comprise: if the determined rate is greater than the predetermined threshold, determining that the discharged fluid substantially comprises drilling fluid and substantially doesn't comprise native formation fluid; if the monitored fluid pressure remains substantially constant during an intermediate portion of a time period in which the monitored chamber volume is decreasing, determining that the discharged fluid comprises gas that was dissolved in solution before being drawn from the subterranean formation, that escaped solution upon decompression within the chamber, and that is dissolving back into solution during the intermediate portion of the time period; if the determined rate is less than the predetermined threshold, and the monitored pressure increases to a predetermined value before the monitored chamber volume stops decreasing, determining that the discharged fluid at least partially comprises native formation fluid that at least partially comprises gas; if the determined rate is less than the predetermined threshold, and the monitored pressure increases to the predetermined value at substantially the same time that the monitored chamber volume stops decreasing, determining that the discharged fluid substantially comprises native formation fluid that substantially comprises gas; and if the determined rate is less than the predetermined threshold, and the monitored pressure does not increase to the predetermined value, determining that the discharged fluid substantially comprises native formation fluid that substantially comprises gas. The chamber may be a fluid displacement chamber of a pump, and the predetermined value may be a maximum operating pressure of the pump. Operating the downhole sampling tool to discharge the fluid from the chamber may direct the discharged fluid through a fluid path between the chamber and a wellbore in which the downhole sampling tool is disposed adjacent the subterranean formation, wherein the fluid path may include a check valve having a set pressure that is substantially greater than a wellbore pressure of fluid within the wellbore surrounding the downhole sampling tool, and the predetermined value may be the set pressure.

The present disclosure also introduces an apparatus comprising: a downhole sampling tool for conveyance within a wellbore extending into a subterranean formation, wherein the downhole sampling tool comprises a chamber having a chamber volume, wherein the downhole sampling tool is operable to adjust the chamber volume, draw fluid from the subterranean formation into the chamber, and discharge the fluid from the chamber into the wellbore, and wherein the downhole sampling tool further comprises: a first sensor operable to generate first information related to pressure of the fluid within the chamber; and a second sensor operable to generate second information indicative of the chamber volume; and a processing device operable to receive the first and second information generated by the first and second sensors, respectively, and assess contamination of the fluid discharged from the chamber based on the received first and second information.

The processing device may be operable to determine a ratio between the first information and the second information, and the determined ratio may be indicative of contamination of the fluid discharged from the chamber.

The downhole sampling tool may be operable to draw fluid from the subterranean formation into the chamber and discharge the fluid from the chamber into the wellbore by adjusting the chamber volume.

The downhole sampling tool may comprise a pump. The pump may comprise a piston reciprocally driven within a cylinder. The chamber may be at least partially defined by surfaces of the piston and the cylinder. The second information may include, or may be indicative of, a position of the piston relative to the cylinder. The downhole sampling tool may be operable to adjust the chamber volume by causing relative motion between the piston and the cylinder. The piston may be a single-acting piston. The pump may be a duplex pump, the piston may be a double-acting piston operable to draw/discharge fluid into/from the chamber and an additional chamber of the downhole sampling tool, the downhole sampling tool may further comprise a third sensor operable to generate third information indicative of a volume of the additional chamber, and the processing device may be further operable to receive the third information generated by the third sensor and assess contamination of fluid discharged from the chamber and the additional chamber based on the received first, second, and third information. The chamber and the additional chamber may each be respective portions of the cylinder.

The downhole sampling tool may comprise the processing device.

The wellbore extends from a wellsite, and wellsite surface equipment disposed at the wellsite may comprise the processing device and be operable for communication with the downhole sampling tool to receive the first and second information.

The first and second sensors may be operable to generate the first and second information as the chamber volume decreases and the pressure of the fluid within the chamber increases.

The downhole sampling tool may further comprise: a fluid path extending between the chamber and the wellbore; and a valve operable to close when operating the downhole sampling tool to discharge fluid from the subterranean formation into the chamber and operable to open when operating the downhole sampling tool to draw the fluid from the chamber.

The downhole sampling tool may further comprise: a fluid path extending between the chamber and the wellbore; and a check valve having a set pressure that is substantially greater than a wellbore pressure of fluid within the wellbore surrounding the downhole sampling tool, such that the pressure of the fluid within the chamber exceeds the wellbore pressure before the fluid discharged from the chamber is transmitted through the check valve to the wellbore.

The downhole sampling tool may be operable to draw fluid from the subterranean formation into the chamber by increasing the chamber volume at a rate sufficient to decrease pressure in the chamber to below a formation pressure of fluid contained within the subterranean formation.

The downhole sampling tool may further comprise: a fluid path extending between the chamber and a probe of the downhole sampling tool that is in fluid communication with the subterranean formation; and a flow control device operable to restrict flow of fluid drawn from the subterranean formation into the chamber. The flow control device may be a check valve having a set pressure substantially greater than a formation pressure of fluid contained within the subterranean formation. The flow control device may be a valve operable to close fluid flow through the fluid path.

The processing device may comprise: a processor; and a memory storing instructions that, when executed, cause the processor to determine a relationship between the chamber volume and the pressure of the fluid being discharged from the chamber. The contamination assessment may be based on the relationship.

The present disclosure also introduces a method comprising: conveying a downhole sampling tool within a wellbore extending into a subterranean formation, wherein the downhole sampling tool comprises a pump comprising: a cylinder; a piston slidably disposed in the cylinder; and a chamber at least partially defined by at least one external surface of the piston and at least one internal surface of the cylinder such that a volume of the chamber is variable in response to movement of the piston within the cylinder; operating the pump to draw fluid from a subterranean formation into the chamber; operating the pump to discharge the fluid from the chamber while monitoring pressure of the fluid and volume of the chamber; and assessing contamination of the discharged fluid based on the monitored fluid pressure and the monitored chamber volume.

The method may further comprise determining a ratio between the monitored fluid pressure and the monitored chamber volume, and assessing the contamination of the discharged fluid may be based on the determined ratio.

Operating the pump to draw fluid from the subterranean formation into the chamber may comprise decreasing pressure within the chamber to below a bubble point pressure of solution gas in the fluid.

Operating the pump to discharge the fluid from the chamber may direct the discharged fluid through a fluid path between the chamber and the wellbore. The fluid path may include a valve. The valve may be closed when operating the pump to draw fluid from the subterranean formation into the chamber, and the valve may be open when operating the pump to discharge the fluid from the chamber.

Operating the pump to discharge the fluid from the chamber may direct the discharged fluid through a fluid path between the chamber and the wellbore, and the fluid path may include a check valve having a set pressure that is substantially greater than a wellbore pressure of fluid within the wellbore surrounding the downhole sampling tool, such that the monitored fluid pressure ultimately exceeds the wellbore pressure before the fluid discharged from the chamber is transmitted through the check valve to the wellbore.

Operating the pump to draw fluid from the subterranean formation into the chamber may comprise operating the pump to increase the volume of the chamber at a rate sufficient to decrease pressure in the chamber to below a formation pressure of fluid contained within the subterranean formation.

Operating the pump to draw fluid from the subterranean formation into the chamber may comprise: increasing volume of the chamber during a period of time; and restricting flow of fluid drawn from the subterranean formation into the chamber during at least a portion of the period of time. Restricting the flow of fluid into the chamber may be via a flow control device fluidly connected between the chamber and a probe of the downhole sampling tool that is in fluid communication with the subterranean formation. The flow control device may be a valve, and restricting the flow of fluid into the chamber may comprise closing the valve. The flow control device may be a check valve having a set pressure substantially greater than a formation pressure of fluid contained within the subterranean formation.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
    operating a downhole sampling tool to draw fluid from a subterranean formation into a chamber of the downhole sampling tool;
    operating the downhole sampling tool to discharge the fluid from the chamber while monitoring pressure of the fluid and volume of the chamber; and
    assessing contamination of the discharged fluid based on the monitored fluid pressure and the monitored chamber volume,
    further comprising determining a ratio between the monitored fluid pressure and the monitored chamber volume, wherein assessing the contamination of the discharged fluid is based on the determined ratio.

2. The method of claim 1, wherein operating the downhole sampling tool to draw fluid from the subterranean formation into the chamber comprises decreasing pressure within the chamber to below a bubble point pressure of solution gas in the fluid.

3. The method of claim 1 wherein operating the downhole sampling tool to discharge the fluid from the chamber directs the discharged fluid through a fluid path between the chamber and a wellbore in which the downhole sampling tool is disposed adjacent the subterranean formation, and wherein the fluid path includes a valve.

4. The method of claim 3 wherein the valve is a check valve having a set pressure that is substantially greater than a wellbore pressure of fluid within the wellbore surrounding the downhole sampling tool, such that the monitored fluid pressure ultimately exceeds the wellbore pressure before the fluid discharged from the chamber is transmitted through the check valve to the wellbore.

5. The method of claim 1 wherein operating the downhole sampling tool to draw fluid from the subterranean formation into the chamber comprises operating the downhole sampling tool to increase the volume of the chamber at a rate sufficient to decrease pressure in the chamber to below a formation pressure of fluid contained within the subterranean formation.

6. The method of claim 1 wherein operating the downhole sampling tool to draw fluid from the subterranean formation into the chamber comprises:
    increasing volume of the chamber during a period of time; and
    restricting flow of fluid drawn from the subterranean formation into the chamber during at least a portion of the period of time.

7. The method of claim 1 wherein assessing contamination comprises:
    determining a rate of an increase of the monitored fluid pressure relative to a decrease of the monitored chamber volume; and
    comparing the determined rate to a predetermined threshold.

8. The method of claim 7 wherein assessing contamination comprises:
    if the determined rate is greater than the predetermined threshold, determining that the discharged fluid substantially comprises drilling fluid and substantially doesn't comprise native formation fluid; and
    determining that the discharged fluid at least partially comprises native formation fluid if the determined rate is less than the predetermined threshold.

9. The method of claim 7 wherein assessing contamination comprises:
    if the determined rate is greater than the predetermined threshold, determining that the discharged fluid substantially comprises drilling fluid and substantially doesn't comprise native formation fluid;
    if the monitored fluid pressure remains substantially constant during an intermediate portion of a time period in which the monitored chamber volume is decreasing, determining that the discharged fluid comprises gas that was dissolved in solution before being drawn from the subterranean formation, that escaped solution upon decompression within the chamber, and that is dissolving back into solution during the intermediate portion of the time period;

if the determined rate is less than the predetermined threshold, and the monitored pressure increases to a predetermined value before the monitored chamber volume stops decreasing, determining that the discharged fluid at least partially comprises native formation fluid that at least partially comprises gas;

if the determined rate is less than the predetermined threshold, and the monitored pressure increases to the predetermined value at substantially the same time that the monitored chamber volume stops decreasing, determining that the discharged fluid substantially comprises native formation fluid that substantially comprises gas; and if the determined rate is less than the predetermined threshold, and the monitored pressure does not increase to the predetermined value, determining that the discharged fluid substantially comprises native formation fluid that substantially comprises gas.

10. A method comprising:
operating a downhole sampling tool to draw fluid from a subterranean formation into a chamber of the downhole sampling tool;
operating the downhole sampling tool to discharge the fluid from the chamber while monitoring pressure of the fluid and volume of the chamber; and
assessing contamination of the discharged fluid based on the monitored fluid pressure and the monitored chamber volume,
wherein:
operating the downhole sampling tool to draw fluid from the subterranean formation into the chamber, operating the downhole sampling tool to discharge the fluid from the chamber while monitoring pressure of the fluid and volume of the chamber collectively, and assessing contamination, collectively, constitute a cycle; and
the method comprises performing multiple instances of the cycle.

11. The method of claim 10 wherein:
performing each instance of the cycle further comprises determining a ratio of the fluid pressure and the chamber volume monitored during that cycle; and
assessing contamination during the performance of each instance of the cycle is based on the ratio determined during that cycle and the ratio determined during at least one previous performance of the cycle.

12. The method of claim 11 further comprising:
detecting that the ratio determined during performance of a cycle is substantially equal to the ratio determined during the immediately preceding cycle; and then
operating the downhole sampling tool to again draw fluid from the subterranean formation into the chamber; and then
operating the downhole sampling tool to discharge the fluid from the chamber into a sample chamber of the downhole sampling tool.

13. An apparatus comprising:
a downhole sampling tool for conveyance within a wellbore extending into a subterranean formation, wherein the downhole sampling tool comprises a chamber having a chamber volume, wherein the downhole sampling tool is operable to adjust the chamber volume, draw fluid from the subterranean formation into the chamber, and discharge the fluid from the chamber into the wellbore, and wherein the downhole sampling tool further comprises:
a first sensor operable to generate first information related to pressure of the fluid within the chamber; and
a second sensor operable to generate second information indicative of the chamber volume; and
a processing device operable to receive the first and second information generated by the first and second sensors, respectively, and assess contamination of the fluid discharged from the chamber based on the received first and second information
wherein the processing device is operable to determine a ratio between the first information and the second information, and wherein the determined ratio is indicative of contamination of the fluid discharged from the chamber.

14. The apparatus of claim 13 wherein the downhole sampling tool comprises a pump, wherein the pump comprises a piston reciprocally driven within a cylinder, and wherein the chamber is at least partially defined by surfaces of the piston and the cylinder.

15. The apparatus of claim 14 wherein the second information includes, or is indicative of, a position of the piston relative to the cylinder.

16. A method comprising:
conveying a downhole sampling tool within a wellbore extending into a subterranean formation, wherein the downhole sampling tool comprises a pump comprising:
a cylinder;
a piston slidably disposed in the cylinder; and
a chamber at least partially defined by at least one external surface of the piston and at least one internal surface of the cylinder such that a volume of the chamber is variable in response to movement of the piston within the cylinder;
operating the pump to draw fluid from a subterranean formation into the chamber;
operating the pump to discharge the fluid from the chamber while monitoring pressure of the fluid and volume of the chamber; and
assessing contamination of the discharged fluid based on the monitored fluid pressure and the monitored chamber volume.

17. The method of claim 16 further comprising determining a ratio between the monitored fluid pressure and the monitored chamber volume, wherein assessing the contamination of the discharged fluid is based on the determined ratio.

18. The method of claim 16 wherein:
operating the pump to draw fluid from the subterranean formation into the chamber comprises:
increasing volume of the chamber during a period of time; and
restricting flow of fluid drawn from the subterranean formation into the chamber during at least a portion of the period of time;
restricting the flow of fluid into the chamber is via a flow control device fluidly connected between the chamber and a probe of the downhole sampling tool that is in fluid communication with the subterranean formation; and the flow control device is either:
    a check valve having a set pressure substantially greater than a formation pressure of fluid contained within the subterranean formation; or
a valve, wherein restricting the flow of fluid into the chamber comprises closing the valve.

* * * * *